US009525566B2

(12) United States Patent
Johnston-Watt et al.

(10) Patent No.: US 9,525,566 B2
(45) Date of Patent: *Dec. 20, 2016

(54) SELF-MANAGED MEDIATED INFORMATION FLOW

(75) Inventors: Duncan Johnston-Watt, Kent (GB); Andrew Martin West, Hampshire (GB); Alan Dearle, Fife (GB); Richard Connor, Glasgow (GB); Dean Alan Sheehan, Cambridge (GB)

(73) Assignee: CLOUDSOFT CORPORATION LIMITED, Edinburgh (GB)

( * ) Notice: Subject to any disclaimer, the term of this patent is extended or adjusted under 35 U.S.C. 154(b) by 1103 days.

This patent is subject to a terminal disclaimer.

(21) Appl. No.: 10/903,156

(22) Filed: Jul. 30, 2004

(65) Prior Publication Data

US 2005/0044268 A1 Feb. 24, 2005

Related U.S. Application Data

(60) Provisional application No. 60/491,777, filed on Jul. 31, 2003.

(51) Int. Cl.
*H04L 12/58* (2006.01)
*H04L 12/24* (2006.01)
(Continued)

(52) U.S. Cl.
CPC ......... *H04L 12/583* (2013.01); *H04L 41/0663* (2013.01); *H04L 41/0668* (2013.01);
(Continued)

(58) Field of Classification Search
CPC ........ G06Q 30/02; G06Q 40/00; G06Q 40/02; G06Q 40/04; G06Q 40/06; H04L 29/06; H04L 63/02; H04L 67/12; H04L 69/329; H04L 12/583; H04L 2012/6443; H04L 2012/6445; H04L 2012/6454; H04L 41/0663; H04L 41/0668; H04L 41/0803; H04L 41/0816; H04L 41/12; H04L 43/0811; H04L 51/063; H04L 67/1002; H04L 67/1008; H04L 67/101; H04L 67/1012; H04L 67/1014; H04L 67/1023; H04L 67/10; H04L 29/08738; H04L 45/00; H04L 45/22; H04L 45/54; H04L 67/2814; H04L 67/327; H04L 12/1859; H04L 12/58; H04L 29/08072; H04L 29/08135; H04L 29/08801; H04L 29/08891; H04L 29/089; H04L 12/2856; H04L 69/16; H04L 12/2801; H04L 69/08; H04L 12/66; H04L 69/161; H04L 69/163; H04L 69/168; H04L 69/164; H04L 12/2834; H04L 69/14; H04L 12/4633; H04L 49/25
(Continued)

(56) References Cited

U.S. PATENT DOCUMENTS 5,769,527 A 6/1998 Taylor et al.
6,108,703 A * 8/2000 Leighton ............ G06F 17/3089
707/E17.119

(Continued)

FOREIGN PATENT DOCUMENTS

EP 1 035 751 A2 9/2000
EP 1 043 671 A2 10/2000
(Continued)

OTHER PUBLICATIONS

Integrating direct broadcast satellite with wireless local access ,Y Zhang, S Dao—... First International Workshop on Satellite-based Information Services, New York, 1996—Citeseer.*
(Continued)

*Primary Examiner* — Greg C Bengzon
(74) *Attorney, Agent, or Firm* — Sughrue Mion, PLLC

(57) ABSTRACT

There is provided a method for mediating the flow of messages in a computer network having a mediation archi-
(Continued)

tecture that includes a plurality of logical nodes arranged in a logical mediation cycle. The method provides algorithms for: handing mediation tasks over between mediator nodes; reconfiguring the logical topology of the mediation architecture in response to a change request while maintaining system invariants; and refining the structure of the mediation architecture by adding whole subnetworks in place of single nodes.

The method also addresses failure detection and recovery.

22 Claims, 38 Drawing Sheets

(51) Int. Cl.
    *H04L 12/26* (2006.01)
    *H04L 29/08* (2006.01)
(52) U.S. Cl.
    CPC ...... *H04L 41/0816* (2013.01); *H04L 43/0811* (2013.01); *H04L 51/063* (2013.01); *H04L 67/101* (2013.01); *H04L 67/1002* (2013.01); *H04L 67/1008* (2013.01); *H04L 67/1012* (2013.01); *H04L 67/1014* (2013.01); *H04L 67/1023* (2013.01); *H04L 67/1034* (2013.01); *H04L 67/26* (2013.01); *H04L 67/288* (2013.01); *H04L 67/2814* (2013.01); *H04L 67/327* (2013.01); *H04L 41/0803* (2013.01); *H04L 41/12* (2013.01)
(58) Field of Classification Search
    USPC ........ 709/201–204, 224–229, 238–244, 200; 370/254, 334, 229–231, 236–238.1, 370/400–407, 428–429, 546; 707/200, 707/705–735, 781–785, 899; 718/100–105
    See application file for complete search history.

(56) References Cited

U.S. PATENT DOCUMENTS

| | | | |
|---|---|---|---|
| 6,128,279 A * | 10/2000 | O'Neil et al. .................. 370/229 |
| 6,226,623 B1 * | 5/2001 | Schein .................. G06Q 30/02 705/35 |
| 6,330,592 B1 * | 12/2001 | Makuch et al. .............. 709/217 |
| 6,349,307 B1 | 2/2002 | Chen |
| 6,519,243 B1 * | 2/2003 | Nonaka et al. ................ 370/338 |
| 6,646,984 B1 * | 11/2003 | Mehra et al. .................. 370/220 |
| 6,785,704 B1 * | 8/2004 | McCanne ............ H04L 69/329 709/201 |
| 6,799,221 B1 * | 9/2004 | Kenner ............ H04L 67/1008 709/203 |
| 6,816,493 B2 * | 11/2004 | Shi et al. .................. 370/395.4 |
| 6,820,132 B1 * | 11/2004 | Puente et al. ................ 709/238 |
| 6,944,785 B2 * | 9/2005 | Gadir et al. .................... 714/4 |
| 6,968,394 B1 * | 11/2005 | El-Rafie ........................ 709/245 |
| 6,970,947 B2 * | 11/2005 | Ebling et al. ................. 709/246 |
| 6,983,259 B1 * | 1/2006 | Foray .................... G06Q 20/10 705/35 |
| 7,013,322 B2 * | 3/2006 | Lahr .................. G06F 17/30887 707/E17.115 |
| 7,079,532 B2 * | 7/2006 | Li ................................ 370/388 |
| 7,111,074 B2 * | 9/2006 | Basturk .......................... 709/241 |
| 7,167,865 B1 | 1/2007 | Tharp et al. |
| 7,185,077 B1 * | 2/2007 | O'Toole et al. .............. 709/223 |
| 7,203,743 B2 | 4/2007 | Shah-Heydari |
| 7,213,246 B1 | 5/2007 | Van Rietschote et al. |
| 7,251,222 B2 * | 7/2007 | Chen et al. .................... 370/256 |
| 7,254,109 B2 * | 8/2007 | Verma et al. .................. 370/217 |
| 7,280,538 B2 * | 10/2007 | Li ................................ 370/390 |
| 7,296,191 B2 * | 11/2007 | Bae et al. ...................... 714/47 |
| 7,349,980 B2 * | 3/2008 | Darugar et al. .............. 709/238 |
| 7,362,709 B1 * | 4/2008 | Hui et al. ...................... 370/237 |
| 7,380,017 B2 * | 5/2008 | Weil et al. .................... 709/239 |
| 7,403,980 B2 * | 7/2008 | Stringer-Calvert et al. ... 709/220 |
| 7,406,537 B2 * | 7/2008 | Cullen ........................... 709/238 |
| 7,447,774 B2 * | 11/2008 | Viswanath et al. ........... 709/225 |
| 7,461,147 B1 * | 12/2008 | Mowat et al. ................. 709/225 |
| 7,467,225 B2 * | 12/2008 | Anerousis et al. ........... 709/238 |
| 7,487,550 B2 * | 2/2009 | Todd ............................... 726/27 |
| 7,571,211 B1 * | 8/2009 | Melick .................... H04L 51/14 379/88.13 |
| 7,584,285 B2 * | 9/2009 | Hudson et al. ............... 709/228 |
| 7,702,744 B2 * | 4/2010 | Hoshiai et al. ............... 709/217 |
| 7,747,697 B2 * | 6/2010 | Hoshiai et al. ............... 709/217 |
| 7,769,871 B2 * | 8/2010 | Boulia .......................... 709/227 |
| 7,788,403 B2 * | 8/2010 | Darugar et al. .............. 709/238 |
| 7,822,862 B2 * | 10/2010 | Slater et al. .................. 709/229 |
| 7,903,029 B2 * | 3/2011 | Dupray .................. G01S 5/0257 342/442 |
| 8,060,926 B1 * | 11/2011 | Ebrahimi ................ H04L 63/02 713/153 |
| 8,122,118 B2 * | 2/2012 | Hickson et al. .............. 709/224 |
| 8,131,834 B1 * | 3/2012 | Augart ........................... 709/223 |
| 8,543,644 B2 * | 9/2013 | Gage et al. ................... 709/203 |
| 8,578,032 B2 * | 11/2013 | Zombek et al. .............. 709/227 |
| 8,606,942 B2 * | 12/2013 | Perlman et al. .............. 709/229 |
| 8,683,075 B1 * | 3/2014 | Joffe et al. .................... 709/238 |
| 9,258,765 B1 * | 2/2016 | daCosta .................. H04W 84/18 |
| 2001/0027491 A1 * | 10/2001 | Terretta et al. ............... 709/238 |
| 2002/0026289 A1 * | 2/2002 | Kuzunuki ............... G01C 21/34 702/150 |
| 2002/0032642 A1 * | 3/2002 | Chichilnisky .......... G06Q 40/04 705/37 |
| 2002/0046287 A1 | 4/2002 | La Porta et al. |
| 2002/0116397 A1 * | 8/2002 | Berg ............................. 707/200 |
| 2002/0120837 A1 * | 8/2002 | Maxemchuk .......... G06Q 40/04 713/153 |
| 2002/0156918 A1 * | 10/2002 | Valdevit ................... H04L 49/25 709/238 |
| 2002/0169889 A1 * | 11/2002 | Yang ........................ H04L 29/06 709/244 |
| 2002/0173984 A1 * | 11/2002 | Robertson ............. G06Q 10/10 709/220 |
| 2002/0194130 A1 * | 12/2002 | Maegawa ............... H04L 29/06 705/51 |
| 2003/0007461 A1 * | 1/2003 | Chen et al. .................... 370/254 |
| 2003/0028636 A1 * | 2/2003 | Cherkasova ............ H04L 29/06 709/225 |
| 2003/0051055 A1 * | 3/2003 | Parrella, Sr. ........ G06F 17/30902 709/246 |
| 2003/0065762 A1 * | 4/2003 | Stolorz ............... H04L 12/2602 709/223 |
| 2003/0083973 A1 * | 5/2003 | Horsfall .................. G06Q 30/08 705/37 |
| 2003/0108030 A1 * | 6/2003 | Gao ....................... H04L 12/4633 370/351 |
| 2003/0120502 A1 * | 6/2003 | Robb ...................... G06Q 30/04 705/34 |
| 2003/0123446 A1 * | 7/2003 | Muirhead ........... H04L 12/4641 370/392 |
| 2003/0126059 A1 * | 7/2003 | Hensley ................. G06Q 40/06 705/36 R |
| 2003/0154239 A1 * | 8/2003 | Davis ..................... H04L 63/0227 709/201 |
| 2003/0167352 A1 * | 9/2003 | Hoshiai ............... G06F 17/3061 719/318 |
| 2003/0174648 A1 * | 9/2003 | Wang .................. H04L 65/1013 370/235 |
| 2003/0179775 A1 * | 9/2003 | Carolan ................. H04L 67/16 370/469 |
| 2003/0187984 A1 * | 10/2003 | Banavar ................ H04L 29/06 709/225 |
| 2003/0225873 A1 * | 12/2003 | Wade ........................... 709/223 |
| 2003/0225889 A1 * | 12/2003 | Moutafov ..................... 709/227 |
| 2003/0229674 A1 * | 12/2003 | Cabrera et al. ............... 709/207 |
| 2004/0002972 A1 * | 1/2004 | Pather ..................... G06F 9/542 |
| 2004/0003400 A1 * | 1/2004 | Carney .................. G06Q 30/02 725/42 |

(56) References Cited

U.S. PATENT DOCUMENTS

| | | | |
|---|---|---|---|
| 2004/0010617 A1* | 1/2004 | Akahane | H04L 12/5695 709/243 |
| 2004/0034591 A1* | 2/2004 | Waelbroeck | G06Q 30/0251 705/37 |
| 2004/0054723 A1* | 3/2004 | Dayal | H04L 67/104 709/204 |
| 2004/0098447 A1 | 5/2004 | Verbeke et al. | |
| 2004/0103193 A1 | 5/2004 | Pandya et al. | |
| 2004/0111473 A1* | 6/2004 | Lysenko | H04L 29/06027 709/206 |
| 2004/0143672 A1* | 7/2004 | Padmanabham | H04L 29/06027 709/231 |
| 2004/0153545 A1* | 8/2004 | Pandya | H04L 69/162 709/226 |
| 2004/0158455 A1* | 8/2004 | Spivack | G06F 17/30731 704/9 |
| 2004/0168121 A1* | 8/2004 | Matz | G06F 17/30867 715/255 |
| 2004/0205250 A1* | 10/2004 | Bain et al. | 709/249 |
| 2004/0260745 A1* | 12/2004 | Gage et al. | 709/200 |
| 2004/0264481 A1* | 12/2004 | Darling | H04L 29/06 370/401 |
| 2004/0267920 A1* | 12/2004 | Hydrie | H04L 29/06 709/223 |
| 2004/0268358 A1* | 12/2004 | Darling | H04L 29/06 718/105 |
| 2005/0063401 A1* | 3/2005 | Kenner | H04L 67/1008 370/401 |
| 2005/0071443 A1* | 3/2005 | Menon | H04L 29/06 709/223 |
| 2005/0074007 A1* | 4/2005 | Samuels | H04L 1/1887 370/392 |
| 2005/0102405 A1* | 5/2005 | Siegel | 709/227 |
| 2005/0283525 A1* | 12/2005 | O'Neal et al. | 709/223 |
| 2005/0289145 A1* | 12/2005 | Voegel | G06F 17/30867 |
| 2006/0013240 A1* | 1/2006 | Ma | H04L 45/583 370/401 |
| 2006/0039364 A1* | 2/2006 | Wright | H04L 41/0893 370/352 |
| 2006/0041498 A1* | 2/2006 | Hausman | G06Q 40/00 705/37 |
| 2006/0167883 A1* | 7/2006 | Boukobza | G06F 17/30557 |
| 2007/0174471 A1* | 7/2007 | Van Rossum | H04L 29/06 709/229 |
| 2008/0016198 A1 | 1/2008 | Johnston-Watt et al. | |
| 2008/0212472 A1* | 9/2008 | Musacchio | H04Q 3/68 370/232 |
| 2008/0215718 A1* | 9/2008 | Stolorz | H04L 61/1511 709/223 |
| 2008/0259936 A1* | 10/2008 | Hussain | H04L 12/5693 370/397 |
| 2008/0319857 A1* | 12/2008 | Dobbins et al. | 705/14 |
| 2011/0035463 A1* | 2/2011 | Dillon | 709/217 |
| 2012/0011051 A1* | 1/2012 | Waelbroeck | G06Q 30/08 705/37 |
| 2016/0164977 A1* | 6/2016 | Salonen | H04L 67/14 709/206 |

FOREIGN PATENT DOCUMENTS

| | | |
|---|---|---|
| WO | 99/23784 A2 | 5/1999 |
| WO | 2005/013554 A2 | 2/2005 |

OTHER PUBLICATIONS

U.S. Appl. No. 11/761,523.
U.S. Appl. No. 10/903,513.

\* cited by examiner

Logical grouping with central mediation node

Physical manifestation with heavy bandwidth requirement on central node

Mediation nodes

Central network arrangement
avoids heavy bandwidth
requirement on any one node

Fig.6.

Table 1:

| Node | LPP | MR | M | TP |
|---|---|---|---|---|
| Incoming | S addressers implemented by credit balance TP | S addressers implemented via local reference count | S addressers implemented by credit balance MR | S addressers implemented via local reference count |
| Node state | address of MR | routing map; credit balance; reference count | address of TP; mediation state | addresses of LPPs; Interest list; credit balance; reference count |

Fig.7.

Table 2: Failure Matrix

| failing node (f) | LPP | MR | M | TP |
|---|---|---|---|---|
| Incoming | S addressers implemented by credit balance of TPs | S addressers implemented via local reference count | S addressers implemented by credit balance of MRs | S addressers implemented via local reference count |
| Node state | Address of MR local interest list | Routing map credit balance reference count | Address of TP mediation state | Addresses of LPPs Per-topic interest lists credit balance reference count |
| Impacts in | all TP LPP's clients | local LPPs | all MRs | Local Ms |
| Impacts out | single MR LPP's clients | all Ms | single TP | all LPPs |
| Pattern at failure detection node x denotes addr of reporting node | Multiple: Error(TP,x,f) Multiple: Error(MR,?,x) | Multiple: Error(M,?,x) Multiple: Error(LPP,x,f) | Multiple: Error(MR,x,f) Multiple: Error(TP,?,x) | Multiple: Error(LPP,?,x) Multiple: Error(M,x,f) |

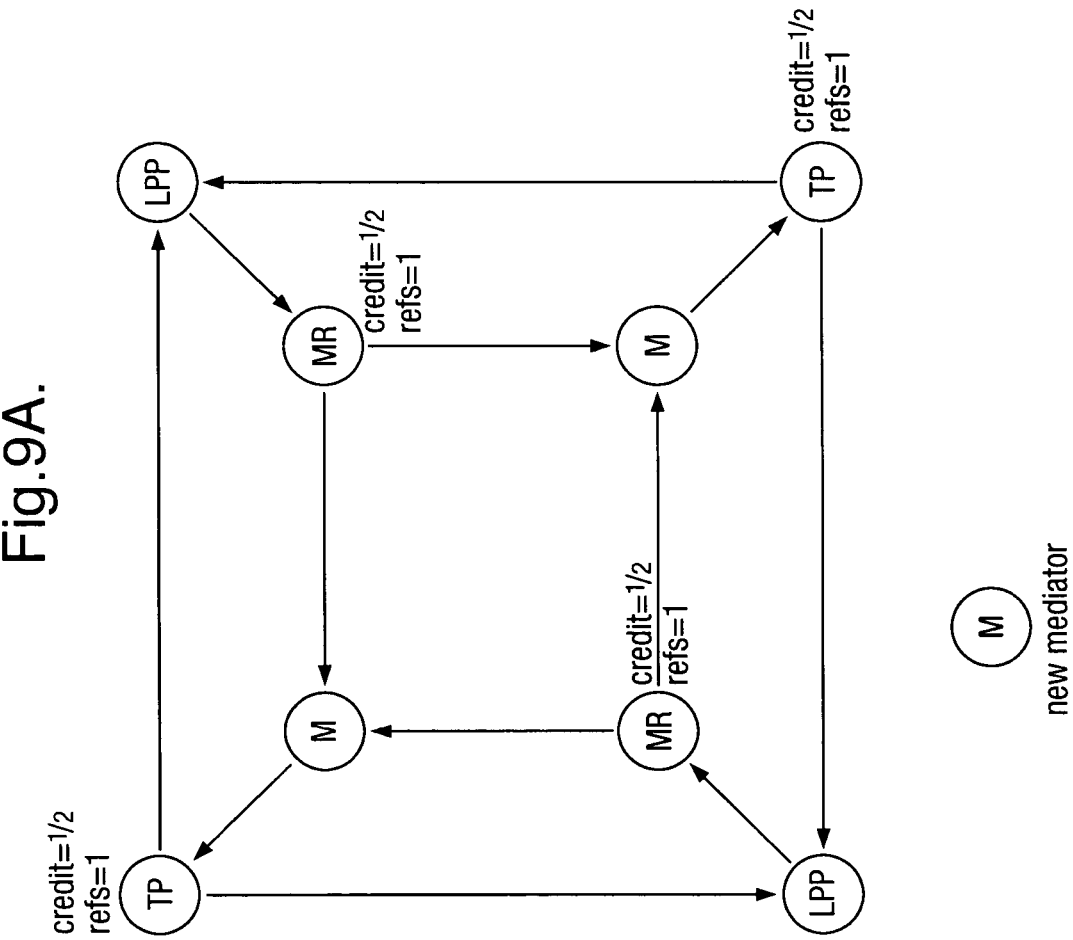

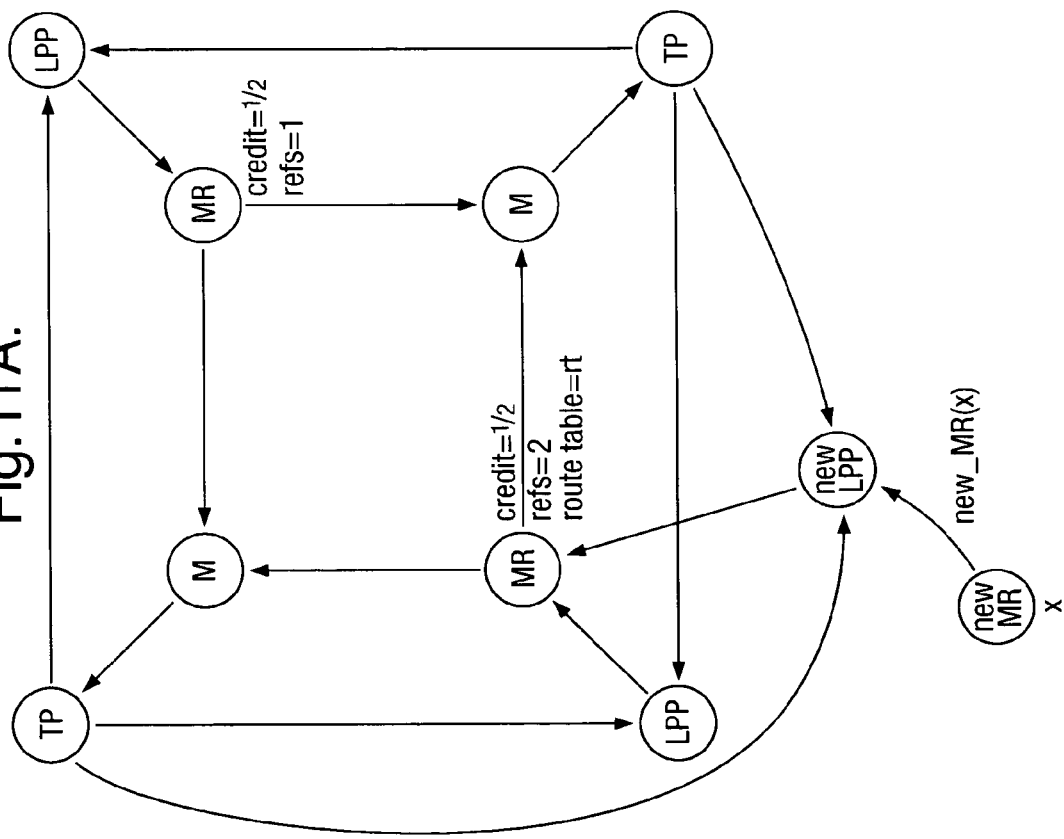

$\Sigma_i$ =Sum of internal state
other than topology information

MR/TP Bus Topology

SELF-MANAGED MEDIATED INFORMATION FLOW

This application claims benefit of Provisional Application No. 60/491,777 filed Jul. 31, 2003; the disclosure of which is incorporated herein by reference.

INTRODUCTION

The present invention relates to a mediated information flow system. In particular, the present invention relates to self-managed distributed mediation systems having a requirement both for disseminated, peer-to-peer communication, and for a degree of control of information gathering over the sum of such disseminated messages.

BACKGROUND TO THE INVENTION

Peer-to-peer (P2P) communication systems allow computational entities (peers) to establish software connections (virtual channels) between one another. P2P systems therefore allow peers to communicate or share computational tasks and resources without the explicit need for centralised control. P2P can operate in a generalised network having one or more servers: a peer may provide information (publish) to at least one service on the network and/or register (subscribe) with services on that network to receive information published by another peer.

Messaging systems that benefit from the provision of centralised control are also known. Here, all messages are directed from publishers to subscribers, via a central locus where some computation (mediation) is performed on the messages. New messages (digests, for example) are generated from the input messages and sent to appropriate subscribers.

In prior art centralised mediation systems, all message traffic is transmitted through a central network point (locus), where the mediation service resides. Viewed in terms of logical elements, such systems are constructed as a star-shaped architectural model with a central point of control, where mediation tasks are executed. This model is shown in FIG. 1A: each source (publisher) and sink (subscriber) of information has a line of communication that connects to the central mediation hub. In many cases, the sources and sinks represent the same entities operating in different modes, and may not be architecturally distinguishable.

The problems associated with such an architecture are well known. They are prone to suffer from a lack of bandwidth at the point of mediation. Even though the logical star shape may be superimposed upon a physical network that is highly connected, the essential flow of all information through a central point causes an inherent throughput bottleneck, based upon the bandwidth available between this point and the network (see FIG. 1B). Although advances in networking technologies mean that bandwidth availability continues to improve, increasing bandwidth has an inherent financial cost, and in certain scenarios can cause a real limitation to the throughput of the overall system. This limitation is manifested as a restriction on either the maximum number of users, or the rate at which each user is able to send and receive information.

Indeed there are many examples of systems where neither P2P architectures nor centralised mediation architectures are wholly satisfactory. Often some logical process is required to act over the sum of messages broadcast within the messaging system. Examples of classes of systems where neither architecture is completely suitable include: a trading system where potential buyers and sellers advertise to each other, mediation is required to ensure a transactional matching of requirements; a mediated news or publishing system where a central authority acts as the editorial control, before information is disseminated; a system which is not actively controlled but which requires an ordered log of information flow to be maintained in a central repository; a conversation service which allows a recent context to be presented to a user joining an ongoing conversation; distributing cryptographic keys (the so-called key distribution problem); systems for finding the location of data (state) and services on a distributed network; and systems for locating and communicating with mobile users.

All the examples above have in common a requirement both for peer-to-peer communication, and for a degree of centralised mediation of the flow of information when the communication is viewed as a whole.

It is therefore an object of the invention to obviate or at least mitigate the aforementioned problems.

SUMMARY OF THE INVENTION

In accordance with one aspect of the present invention, there is provided a method for mediating the flow of messages in a computer network, wherein the computer network has a mediation network that includes:

at least one local point of presence (LPP) module for interfacing between the mediation network and client programs;

at least one mediator (M) module for hosting a mediation task;

at least one mediator router (MR) module for analyzing the content of incoming messages, each MR module routing the incoming messages to a predetermined M module in dependence upon said content; and at least one transmission proxy (TP) module for forwarding messages to at least one of said LPP modules, wherein, in the method, incoming messages to the mediation network are propagated along a mediation cycle that comprises the steps of:

an LPP module addressing incoming messages to a respective one of said at least one mediator router (MR) modules;

at said addressed MR module, analyzing the content of incoming messages and routing said messages to a predetermined mediator module in dependence upon said analyzed content;

at said predetermined mediator module, applying the mediation task to said analyzed messages and directing mediated messages to a respective one of said TP modules; and at said TP module that receives said mediated messages, forwarding said mediated messages to at least one of said LPP modules.

Throughout this document, the term physical node refers only to physical machines. The terms "node" and "logical node" are used interchangeably to refer to the locus having state properties. In terms of the logical topology of the mediation network, a module provides the functionality of an associated logical node.

Distributed mediation therefore forms a hybrid between the P2P architecture and the centralised mediation. The logical central hub of the star-shaped architecture is replaced by a central, but distributed, mediation network of mediator nodes that has multiple connections to the outer network of sources and sinks. This approach addresses the bandwidth restrictions of the star-shaped (centrally mediated) architecture. The mediation requirement of the system is distributed among the nodes of the distributed mediation network according to some classification imposed over the set of messages it carries. The set of all incoming messages is separated out into a number of non-overlapping subsets according to the message content. This concept of classification does not affect the outwardly observable behaviour of the system's operation, but only its overall throughput.

The physical arrangement of the distributed mediation network is very different from the centrally mediated network: in the former case, there are many network connections to absorb the same amount of information flow, resulting in proportionally lower bandwidth requirements at each physical node. Whereas the logical picture can be represented as a number of mediator nodes placed within a single network, it will be understood that, in reality, the physical node sites may be physically, even geographically, dispersed among a plurality of machines. This is particularly likely to happen when the architecture is deployed at sites around the world, when there is unlikely to be any close relationship between the logical and physical architectures.

Clearly, the advantages of this approach stem from the physical organisation of networked machines. Each mediator module is capable of autonomous functionality, being able to perform its action without reference to any other module. In other words, no module has global dependency on any other module or requires any detailed knowledge of the network beyond its immediate neighbours. Given a highly connected network infrastructure, the maximum required bandwidth, to achieve a given throughput, is reduced to an arbitrarily low value. Given that the mediation load can be evenly divided among the machines employed by the mediation service, this can be achieved by scaling up the number of mediator nodes on the network. The maximum required bandwidth at any one point within the network is still proportional to the network load, but is also inversely proportional to the number of mediator nodes deployed. Naturally, any extra network load caused by organising the splitting of the whole mediation requirement onto a number of platforms must be low enough to avoid negating the benefits of the architecture.

The incoming messages handled by the mediation network may belong to one of the group of message types including: new information, which emanates from a process acting as an information source; queries about state of nodes in the mediation network, which require a reply; and expressions of interest, which require ongoing replies whenever pertinent new information is received by the mediation network.

By directing a control message as an incoming message along the mediation cycle, the method may induce a change in internal operation of the mediation network.

In addition to carrying client messages, the distributed mediation network facilitates the dissemination of control or management messages. Management messages differ in that they are concerned only with the propagation of instructions to successive nodes in each cycle within the network, in particular to effect changes in internal operation. They may be interleaved with client messages.

By addressing changes in internal operation, the present invention seeks to allow both dynamic load balancing to take place within a fixed topology network, and mediation process migration in association with arbitrary changes in logical topology, without introducing instability in either case.

The change in internal operation may be a handover of a mediation task between a donor mediator module and a recipient mediator module, wherein the control message is a mediator handover message, the content of the mediator handover message describing the reallocation of content having a predetermined content tag from the donor mediator module to the recipient mediator module, where the donor mediator module is currently registered as handling said content, and wherein the direction of the mediator handover message comprises:

from a predetermined LPP module, sending the mediator handover message to a respective associated MR module;

at the associated MR module, reading said content tag and forwarding the message to the donor mediator module; and upon receipt of the mediator handover message, the donor mediator module: changing mediator node state; sending a MEDIATOR_HANDOVER message to the recipient mediator module, the MEDIATOR_HANDOVER message containing the content of the mediator handover message; sending a MEDIATOR_CHANGED message to an associated TP module; and then changing state in order to forward messages containing the content tag to the recipient mediator module.

As users' demands vary with time over the classification, the handover operation provides functionality that allows the nodes at which mediation tasks are executed to be moved physically to balance both network and computational loads for the whole system.

The handover preferably further comprises:

the TP module forwarding the MEDIATOR_CHANGED message to at least one LPP module;

the recipient mediator module generating a NEW_MEDIATOR_ACTIVE message, the NEW_MEDIATOR_ACTIVE message having a payload corresponding to the reallocated content, and broadcasting said NEW_MEDIATOR_ACTIVE message to all TP modules associated therewith; and the LPP module buffering all incoming messages between receipt of the MEDIATOR_CHANGED message and receipt of the NEW_MEDIATOR_ACTIVE message.

Advantageously, the method further comprises:

the LPP module then forwarding the NEW_MEDIATOR_ACTIVE message to the associated MR module; and whenever a MR module receives a NEW_MEDIATOR_ACTIVE message, updating a routing table for said MR module to cause future content matching the payload of the NEW_MEDIATOR_ACTIVE message to be sent to the recipient mediator module rather than the donor mediator module; informing the donor mediator module that the routing table has been updated, the donor mediator module thereafter ceasing to forward messages once all MR modules have been informed that the recipient mediator module is now the mediator module for the reallocated content.

The handover operation does not allow for dynamic mediation process migration in the face of arbitrary changes in the logical topology.

The change in internal operation may also be a reconfiguration of the logical topology of the mediation network and wherein the control message is one or more reconfiguration messages.

The reconfiguration of the logical topology preferably includes generation of a causal barrier to ensure that messages passing through the mediation network before the reconfiguration are delivered in advance of messages passing through the mediation network after the reconfiguration. In which case the step of generating the causal barrier may include: circulating said one or more reconfiguration messages around the mediation cycle; and ensuring that each module in the cycle has been sufficiently notified of the reconfiguration.

Advantageously, the reconfiguration of the logical topology of the mediation architecture is the insertion of an additional local point of presence (LPP) node, and said one or more reconfiguration messages include a new_LPP message that uniquely identifies the additional LPP node, the insertion including:

in a predetermined additional LPP module at the additional LPP node, generating the new_LPP message and sending the new_LPP message to a corresponding MR module at an MR node;

in the corresponding MR module, receiving the new_LPP message, updating a reference count for the MR node, and propagating the new_LPP message to all mediator modules in the architecture;

in each mediator module, receiving the new_LPP message, and transmitting the new_LPP message to a respective, corresponding TP module at a TP node, each TP node having an associated credit balance;

in each of the corresponding TP modules, receiving the new_LPP message and sending a respective, extended new_LPP message to the additional LPP module, the extended new_LPP message including the respective associated credit balance;

in the additional LPP module, receiving the extended new_LPP messages, thereby completing the circulation of the new_LPP message; and in the additional LPP module, summing the credit balances, sufficient notification of the reconfiguration being assured when the credit sum reaches a predetermined completion value.

The reconfiguration of the logical topology of the mediation architecture may include the further insertion of an additional mediator router (MR) node, and wherein said one or more reconfiguration messages further include a new_MR message that uniquely identifies the additional MR node, the further insertion including:

the additional LPP sending a new_MR message to a corresponding MR module at an MR node having a corresponding credit balance;

the corresponding MR module responding to the new_MR message by sending a new_MR_route_table message, which includes: address information for the additional MR node, the address of the additional LPP node, routing information and a fraction of the corresponding credit balance;

the corresponding MR module then forwarding the new_MR_route_table message to an arbitrary mediator module;

the arbitrary mediator module passing the new_MR_route_table message to the additional LPP module;

the additional LPP module then passing the routing map to the additional MR module; and in the additional MR module, using the contents of the new_MR_route_table message to initialise a new credit balance and routing maps.

It is preferred that the reconfiguration further includes, changing the MR module that the additional LPP module addresses, to the additional MR module, wherein the additional MR module sends a MR_initialised( ) message to the additional LPP module upon receipt of the new_MR_route_table message and wherein the additional LPP module sends inc_ref_count( ) and dec_ref_count( ) messages to the additional and initial MR modules respectively.

Alternatively, the reconfiguration of the logical topology of the mediation architecture may be the insertion of an additional mediator (M) node, and said one or more reconfiguration messages include a new_M message that uniquely identifies the additional mediator node, the insertion including:

a predetermined additional mediator module generating the new_M message and sending the new_M message to a corresponding TP module at a TP node;

in the corresponding TP module, receiving the new_M message, updating a reference count for the TP node, and propagating the new_M message to all LPP modules in the architecture;

in each LPP module, receiving the new_M message, transmitting the new_M message to a respective, corresponding MR module at an MR node, each MR node having an associated credit balance;

in each of the corresponding MR modules, receiving the new_M message and sending a respective, extended new_M message to the additional mediator module, the extended new_M message including the respective associated credit balance; and in the additional mediator module, receiving the extended new_M messages, thereby completing the circulation of the new_M message; and in the additional mediator module, summing the credit balances, sufficient notification of the reconfiguration being assured when the credit sum reaches a predetermined completion value.

In the latter case, the reconfiguration of the logical topology of the mediation architecture may include the further insertion of an additional transmission proxy (TP) node, and wherein said one or more reconfiguration messages further include a new_TP message that uniquely identifies the additional TP node, the further insertion including:

the additional mediator module receiving the new_TP message;

the additional mediator module adding the address of the additional mediator node to the new_TP message and forwarding the new_TP message to a corresponding TP module at an TP node having a corresponding credit balance;

the corresponding TP module responding to the new_TP message by generating an extended new_TP message, which includes: address information for the additional TP node, the address of the additional mediator node, a list of LPPs and a fraction of the corresponding credit balance;

the corresponding TP module then forwarding the new_TP message to an arbitrary LPP module;

the arbitrary LPP module then passing a new routing map message to the additional TP module;

the additional TP module then passing the routing map to the additional MR module; and the additional TP module using the contents of the new routing map message to initialise a new corresponding credit balance and a list of LPP modules.

Preferably, the reconfiguration further includes: changing the TP module that the additional mediator module addresses to the additional TP module, wherein the additional TP module sends a TP_initialised( ) message to the additional mediator module upon receipt of the new routing map message and wherein the additional mediator module sends inc_ref_count( ) and dec_ref_count( ) messages to the additional and initial TP modules respectively.

The computer network may conveniently further include a failure detection node that is in communication with each node in the mediation network, the method further comprising:

at the failure detection node, providing a failure detection module;

at each node of the mediation network, providing a failure reporting module;

whenever an incoming or outgoing communication link between nodes fails, each of said failure reporting modules reporting information relating to the failing communication link to said failure detection module; and said failure detection module determining whether said failing link is indicative of a failing node.

Where the failure detection module determines that said failing link is indicative of a failing node, the method may further comprise: creating a new node of the same type as the failing node; imbuing the new node with information relating to the failing node's internal state and immediate neighbourhood topology; and reconfiguring the network to use the new node in preference to the failing node.

The method advantageously further comprises generating a message log of all incoming messages received by said predetermined mediator module.

The mediation task applied to said analyzed messages at said predetermined mediator module may include generating the message log. Alternatively, the computer network further includes an external application, and the method may further comprise: generating the message log in said external application.

Conveniently, the change in internal operation may take the form of a structural refinement of the logical topology of the mediation architecture in response to a change request. A subnetwork is advantageously inserted in place of a single node during the step of structural refinement.

In a further aspect of the present invention, there is provided a mediation network for mediating the flow of messages in a computer network, wherein the mediation network includes:

at least one local point of presence (LPP) module for interfacing between the mediation network and client programs;

at least one mediator (M) module for hosting a mediation task;

at least one mediator router (MR) module for analyzing the content of incoming messages, each MR module routing the incoming messages to an associated, predetermined M module in dependence upon said content; and at least one transmission proxy (TP) module for forwarding messages to at least one of said LPP modules, wherein the mediation network couples messages along a unidirectional mediation cycle in which: LPP modules address MR modules; MR modules in turn address M modules; M modules in turn address TP modules; and TP modules in turn address LPP modules.

In accordance with another aspect of the present invention, there is provided a computer program product for mediating the flow of messages in a computer network, the computer program product including executable instructions for providing a mediation network having:

at least one local point of presence (LPP) module for interfacing between the mediation network and client programs;

at least one mediator (M) module for hosting a mediation task;

at least one mediator router (MR) module for analyzing the content of incoming messages, each MR module routing the incoming messages to a predetermined M module in dependence upon said content; and at least one transmission proxy (TP) module for forwarding messages to at least one of said LPP modules, wherein, when the instructions are executed, incoming messages to the mediation network are propagated along a mediation cycle that comprises the steps of: an LPP module addressing incoming messages to a respective one of said at least one mediator router (MR) modules;

at said addressed MR module, analyzing the content of incoming messages and routing said messages to a predetermined mediator module in dependence upon said analyzed content;

at said predetermined mediator module, applying the mediation task to said analyzed messages and directing mediated messages to a respective one of said TP modules; and at said TP module that receives said mediated messages, forwarding said mediated messages to at least one of said LPP modules.

BRIEF DESCRIPTION OF THE DRAWINGS

Examples of the present invention will now be described in detail with reference to the accompanying drawings, in which:

FIG. 6 shows a table (Table 1) of dependencies in the distributed mediation network of the present invention;

FIG. 7 shows a table (Table 2) of the dependencies in a failure handling mechanism in one embodiment of the present invention;

FIGS. 9A to 9D illustrate the steps in adding a new Mediator (M) node to an existing mediation architecture;

FIGS. 11A to 11E illustrate the next steps in adding a new Mediator Router (MR) node to an existing mediation architecture;

DETAILED DESCRIPTION

The P2P and centrally mediated messaging models that provide the background to the present invention are first explained. Throughout this discussion, the term source designates a client that generates new messages to send into a network service and the term sink designates a client that receives messages from a network service. Each client of a network service may be a source, a sink, or both. In an alternative terminology, sources of information are referred to as publishers and sinks for information are referred to as subscribers.

In peer-to-peer content-based routing, a network is configured to allow the efficient transmission of messages from source to sink, based upon the establishment of virtual channels between the appropriate sources and sinks. Efficiency is typically achieved by the detection and removal of unnecessary edges (lines of communication connecting nodes) from a fully connected graph, with the resulting optimised graph then tailored to available network infrastructure. To establish a P2P virtual channel requires an expression of interest from one peer and an acceptance of that interest by the other peer.

Figure 1A:
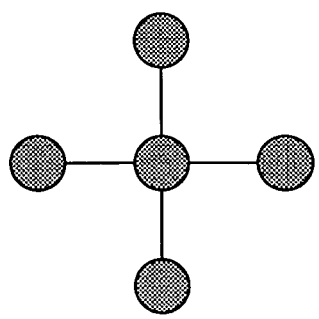
FIG. 1A is a node diagram showing a prior art mediated information flow system with a star-shaped logical architecture.
Figure 1B:
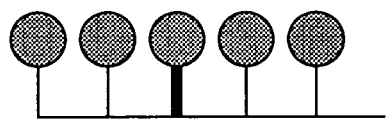
FIG. 1B is a schematic node diagram showing the physical architecture of the system in FIG. 1A.

On the other hand, in centrally mediated models, all messages are transmitted via a central mediation node (see FIGS. 1A and 1B). In the parlance of mediation networks, a mediation service is the general term applied to some computation that is applied to all incoming messages; the mediation requirement for any particular instance of a mediated architecture refers to the collation of all mediation services provided therein; a mediation authority is a person or persons providing such a mediation service; a mediation network is the network of physical computational entities (machines) under the control of the mediation authority; and a mediation server, the physical machine hosting one or more mediation services.

In a simplified model of a generalised mediated information flow system, messages sent to the mediation authority may belong to one of the following types: new information, emanating from a process acting as an information source; queries about state held by the mediation authority, requesting an immediate reply; and expressions of interest, essentially persistent queries requiring ongoing replies whenever pertinent new information is received by the mediation authority.

It is worth remarking that even in a fully mediated model, expressions of interest may still be significant, especially in the delivery of this network service to sinks, where they can reduce the bandwidth requirement on each virtual channel.

In the light of the above definitions, a mediated information flow system is one that consists of messages, containing information, being sent to and from a central authority. Actions taken by this authority may include time-ordered logging of received messages, computation over the sum of messages received up to a point, and dissemination of incoming messages among other clients, possibly after performing some processing based on the message content.

Figure 2A:
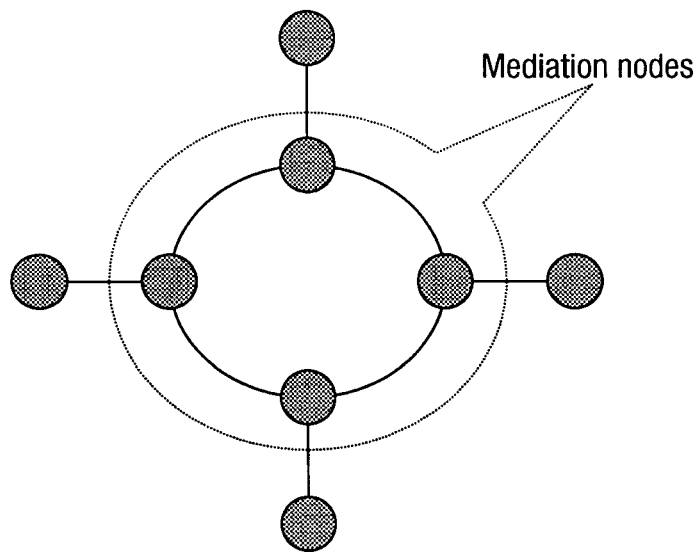
FIG. 2A is a node diagram showing a prior art mediated information flow system with a central network logical architecture.
Figure 2B:
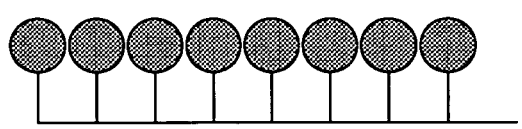
FIG. 2B is a schematic node diagram showing the physical architecture of the system in FIG. 2A.

The present invention represents a hybrid of the content-based, decentralised P2P model and the simple, centrally-mediated network model. Rather than provide a single, central mediator, the various mediation services are dispersed across a mediation network comprising a number of separate functional components. In the hybrid model, expressions of intent are used to open virtual channels between source nodes and mediator nodes, and expressions of interest are used to open virtual channels between the mediator nodes and sink nodes. Messages received by sink nodes are therefore governed by expressions of interest registered with the mediated service. The latency between source and sink nodes is necessarily greater than in simple content-based routing, as there are two or more logical hops involved. Provided the context allows it, the latency in each logical hop can be successively reduced as more static information becomes available. Relative to the simple mediated model, the mediation task is more complex, because it is spread over multiple nodes (see FIG. 2A). However, the inherent central bottleneck of the centrally mediated model has been removed and the resulting architecture is scalable.

The set of all incoming messages is separated out (classified) into a number of non-overlapping subsets (categories) according to the message content. The entire mediation requirement is implemented as a number of mediation tasks, each task separately served in a different process operating over a respective category of incoming message. Each message includes content that indicates whether that message is a member of a particular category or not, the so-called deterministic predicate. This deterministic predicate may be considered to be the "verbal" part of a "sentence" of the message. Incoming messages are therefore classifiable according to deterministic predicates that their content. A category can then be seen as a subset of all possible messages based on an associated deterministic predicate. Indeed, the presence of a given deterministic predicate characterises the corresponding category.

In a mediated news or publishing service where a central authority acts as an editorial control, before information is further disseminated, examples of the deterministic predicate include:
EQUALITY on a unique identifier of document
   e.g. doc_id=1246512331400
   e.g. newsML itemid="238563"
some date/time expression
   e.g. newsML newsitem.date<28 July 2003 and
   newsitem.date>10 January 2001
EQUALITY on Country code of document
   e.g country_code=UK or
   country_code="UK" or country_code="US"
   {using newsML country code}
some topic code associated with what the article is about
   e.g. Topic="human rights" {using a newsML topic code}
some predicate based on the attribute values of a newsML article:
   e.g. <dateline>=="LONDON"
In a transactional trading service where a central authority acts to match the requirements of buyers and sellers. Examples of deterministic predicates include:
Article="piano" and location="NE Scotland" and price<£3
Stock="IBM"
Category="Home>All Categories>Sports" and item="windsurfer"

In a conversation service that allows a recent context to be presented to a user joining an ongoing conversation, the deterministic predicate might be:

Topic="sailing" and category="Topper"
    Topic="Mail servers" and category="sendMail" and operarting system="Unix"and in an example taken from newsgroups
    Topic=alt.money.currency.us-dollars In a the case of Distributing cryptographic keys (the so-called key distribution problem), the deterministic predicate might be based on key value, for example:

Key value>23352345 and keyvalue<66676767979079

In the case of finding the location of data (state) and services on a distributed network, the deterministic predicate may be based on a globally unique identifier (GUID):

e.g. GUID=125645654645 or it might be based on a descriptor of the service we are looking for:

e.g. Service="printer(type="laserjet"; price="4p/page"; size=A0)"

Finally, in the case of locating and communicating with mobile users, examples of deterministic predicates include Name="Bon Monkeyhouse"
    phone number="01776 32463274327"
    e-mail address=asau@hsghdsg.net The set of all categories (and therefore the set of all messages once classified) is referred to as a classification. Classification, therefore, represents a partition of the set of all messages, and a single message may not belong to more than one category. This concept of classification does not affect the outwardly observable behaviour of the system's operation, but only its overall throughput.

The classification of the system is independent of the type of message being sent (new information, expression of interest, or query), since it is based upon some characterisation of the information passed around within the system. Crucially, the classification may occur through an automated process. Such incoming messages may consist of information about, or queries pertaining to, that category within the classification.

The classification of the information system is performed by the mediation authority, and this may occur during the operation of the system. A deterministic predicate must be generated to allow the testing of arbitrary messages for inclusion in the category. For each category thus identified, a separate process is created within the mediation network to handle its mediation service. Finally, it is worth noting that the classification is used only to enhance the performance of the logical system, rather than to change its semantics in any way, and clients of the system will be unaware that it exists.

The mediation task for each category is hosted upon a particular machine (computer) within the mediation network. When the system is operational, messages are sent by clients into the mediation network. Messages received into the network are forwarded to the appropriate mediation service, according to an analysis of their content via the set of all category predicates. This forwarding process requires knowledge of the classification, and the physical location where each mediation task is hosted, to be passed around the mediation network.

Figure 3:
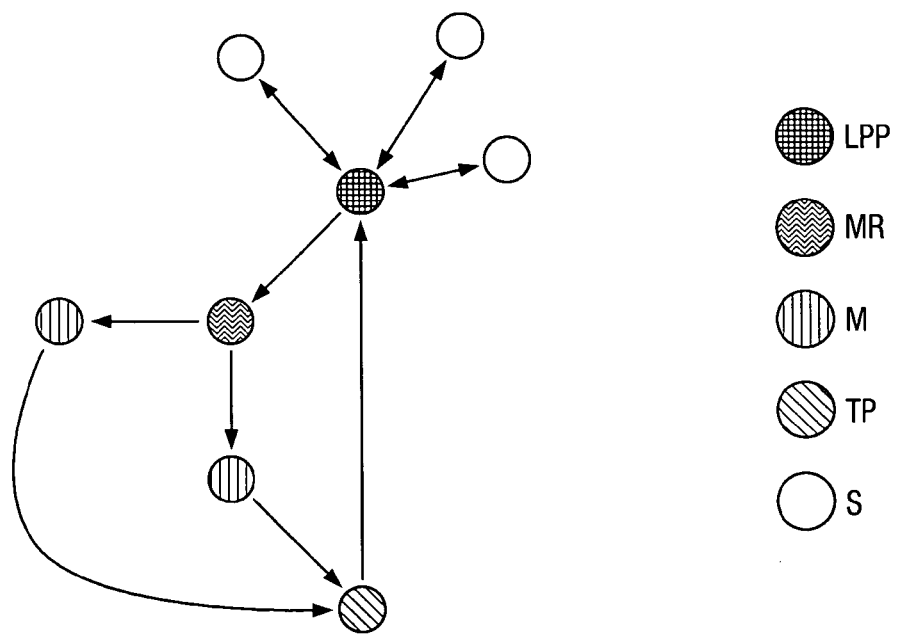
FIG. 3 shows a minimal node diagram showing the fundamental cycle (LPP→MR→M→TP→LPP) of which every effective distributed mediation network node is a part.

FIG. 3 shows a minimal topology that illustrates the functional components of a (hybrid) distributed mediation model that is in a "quiescent" or "steady state", i.e. a state in which there is no provision for changes in the logical topology. The Figure shows how data flows around the system among the various component nodes.

All the component nodes necessary for a distributed mediation model of unlimited scale are present in this minimal topology, including: sources, sinks, local points of presence, mediator routers, mediators and transmission proxies. Throughout the following discussion, these terms and others listed below take a definition as set out below:

Local Point of Presence (LPP): a local point of presence acts as an intermediary between clients (sources and sinks) and the rest of the distributed mediation model. Local points of presence are network nodes that provide proxies for a mediated service for a particular geographical region. Each source or sink will thus communicate with only a single local point of presence, and with no other nodes within the mediation architecture. There may be an arbitrary number of LPPs in a system, each serving a respective number of clients.

Mediator (M): a mediator is a network node incorporating a mediator module, which services the mediation requirement. Each mediator has an associated downstream distribution, which is used to pass relevant messages to LPPs, and therefore, ultimately, to the sinks. Each mediator module implements one or more mediation task, each task acting upon a single category of incoming message. Mediator modules may be configured to log all incoming messages they receive and to forward these messages to the associated downstream transmission network. Mediation tasks may-then include servicing queries over message logs thus generated.

Mediator Router (MR): a mediator router is a network node, incorporating a mediator router module, that analyses the content of incoming messages, determines which category the messages belong to and routes them to an appropriate mediator. Each mediator router sits at the head of an upstream network and receives messages from a number of LPPs. A mediator router may also log incoming messages to allow, for example, a local service within the geographical area it serves.

Transmission Proxy (TP): a transmission proxy is a network node, incorporating a transmission proxy module, that analyses messages output by one or more mediator nodes; determines, from registered expressions of interest, to which sink(s) the outgoing message is directed; and forwards messages on the downstream network associated with each mediator.

The upstream network (from source to mediator router) is seen to be mediated but not content-based. Routing between mediator routers and mediators, in the so-called cross-stream, is content-based. The downstream network, too, requires content-based routing: indeed message routing between mediator routers and LPPs can be regarded as a hybrid content-based delivery mechanism in its own right. The partitioning of the message space as a part of this hybrid allows the introduction of a mid-stream mediation service to the publish and subscribe model without introducing a non-scalable central bottleneck.

For a "quiescent" or "steady state" system, the following statements relating to the distributed mediation network are always true. These statements may be considered "global invariants" of the distributed mediation architecture.

Every node is part of a cycle LPP→MR→M→TP→LPP
    Every LPP addresses a single MR
    Every MR may address any arbitrary M
    Every M addresses a single TP
    Every TP may address any arbitrary LPP The symbol "→" used above represents a unidirectional connection (a directed edge).

Table 1 (FIG. 6) lists the dependencies for "correctness" of mediation change algorithm: i.e. the total extramural knowledge required to be maintained by each node.

From inspection of the "global invariants" above, it is clear why the network illustrated in FIG. 3 is considered to be the minimal distributed mediation topology: it consists of precisely four nodes: one of each type (LPP, MR, M and TP), configured in a simple cycle, with unidirectional connections arranged therebetween: LPP→MR→M→TP→LPP.

Figure 4:
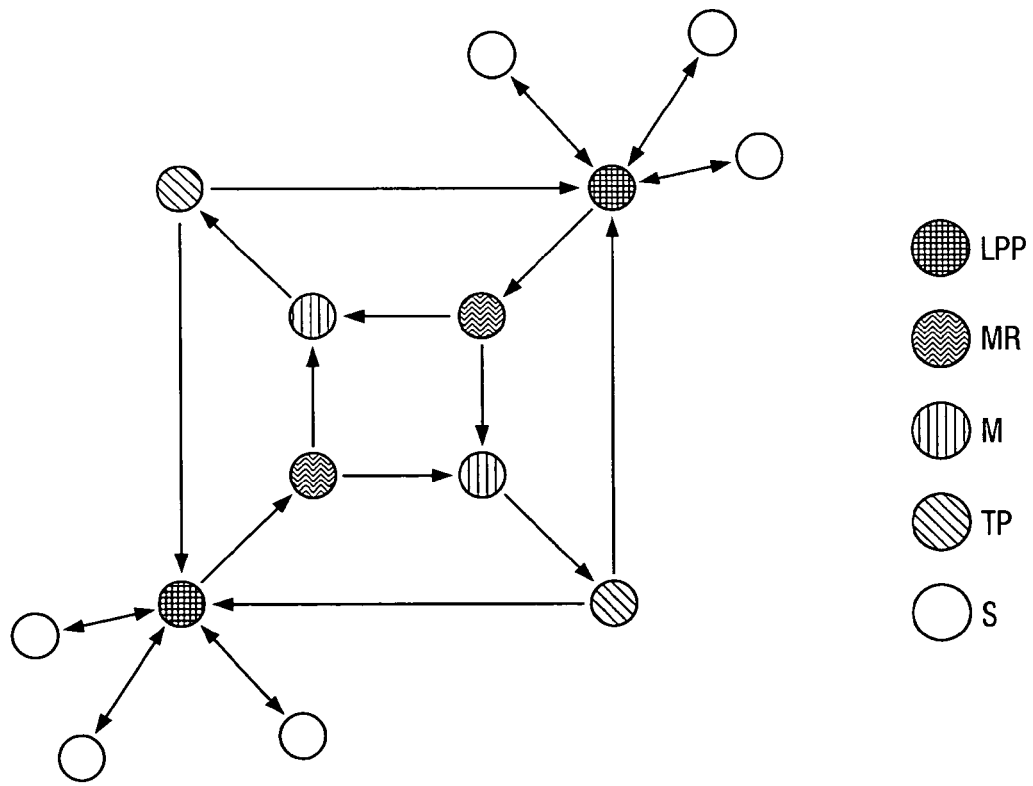
FIG. 4 is a node diagram showing a "cubic" distributed mediation model in accordance with the present invention.

A more realistic, and complex, distributed mediation network is illustrated in FIG. 4. Here, two of each type of node are present in a configuration known hereafter as a "cubic" network. The cubic network illustrates further properties of general distributed mediation networks.

As in the cyclic network, the message flow between connected nodes is unidirectional. Every node in the cubic network is a component of at least one cycle, LPP→M-R→M→TP→LPP. The cubic network exhibits a "fan in/fan out" topology: while every LPP sends each message to precisely one MR, each MR may be addressed by a plurality of LPPs (two in FIG. 4)—fan-in; every MR is capable of sending a message to any mediator—fan-out; every mediator sends any given message to precisely one TP, while each TP may be addressed by a plurality of mediators—fan-in; and finally, every TP is capable of sending a message to any LPP—fan-out.

Distributed mediation networks such as the minimal cyclic and the cubic networks also display another important property: a directed path exists from every node to every other node in the network. In graph theoretical terms, every node is in the transitive closure of every other node. This property holds trivially for cyclic networks: it does however hold in more complex distributed mediation networks, as consequence of the global invariant properties. The directed path can always be considered as a directed cyclic graph. Thus for any two nodes A and B within a generalised distributed mediation network, a cycle exists from A to A which contains B. It is worth noting that in a cubic (single-level) network the maximum path length of such a cycle is 8, rather than 4.

Again, each node has no global dependency or any detailed knowledge of the network beyond its immediate neighbours. Each node stores identities only of those nodes it directly addresses. Nodes also store information about the totality of nodes which address each node within the network; this may be stored either as a reference count in the node itself, or as a credit balance value in all nodes that directly address it. In either case the identities of the addressing nodes need not be stored. Indeed, no node need store any further information about the rest of the global system.

A further important property of the distributed mediation network of the present invention it that behaviour is deterministic and ordered within each node; that is, it is possible to ensure that a message B arriving after a message A is also dispatched after message A. Likewise, messages can not overtake on direct links between nodes; thus, for any two nodes N1 and N2 such that N2 is directly addressed by N1, then if a message A is sent to N2 by N1, and subsequently a message B is sent to N2 from N1, then N2 will receive message A before receiving message B.

Causal Barrier

Each node in the generalised distributed mediation network has detailed knowledge of the existence only of other nodes to which it directly sends messages. Information about nodes from which it receives messages is stored in a form representing only the totality of such nodes. As has been mentioned previously, this information may be stored either as a reference count in the node itself, or as a credit balance value in all nodes that directly address it.

In certain cases, some degree of global control is required to effect change within the network while maintaining ordered, deterministic behaviour. This is where information about the totality of nodes which address each node within the network becomes useful. The distributed mediation network requires a further property whereby a set of coherent changes can be made apparently atomically with respect to any message passing within the system at the time the change is made: a property referred to as a causal barrier algorithm.

Where the addresser information is stored as a reference count, the causal barrier algorithm is a totality of receipt algorithm. In cases where one copy of a given message is expected at a target node from every node that directly addresses the target node, it is possible to establish that this has indeed happened as follows: the target node maintains a reference count, which corresponds to the number of nodes that directly address it; whenever a message is sent, information is added to include the unique identity of the sending node; if the receiver requires to detect whether copies of the same message are sent by all sending nodes, then the sending node identifier information is retained locally in association with a corresponding message ID; and when the number of such unique messages received is equal to the reference count, then the message is known to have been received from all nodes that directly address it.

For nodes that do not contain a reference count, a different causal barrier algorithm may be used. This algorithm relies on the presence of a credit balance field in each node that directly addresses the receiving node. Whenever a message is sent, information is added to include the unique identity of the sending node and the value of the credit balance field. If the receiver requires to detect whether copies of the same message are sent by all nodes, then the sending node identifier information ID is retained locally in association with the message ID. Furthermore, a credit balance accumulator is maintained, which is set to contain the total of all credit balance values contained in such messages. The message is known to have been received from all sending nodes when the credit balance accumulator becomes equal to a predetermined total value, say, 1.0.

Both reference counting and credit balancing techniques, therefore, ensure that the causal barrier algorithm can confirm that all messages have been received by the appropriate modules, thereby establishing the termination of the causal barrier algorithm for any particular change in the internal topology of the mediation network. The application of such "book-keeping techniques" allows mediator modules to detect when a mediation change is complete without requiring static knowledge of the number of MR modules sending information to them.

Evenly dividing mediation load over physical machines is not generally responsive to changes in load conditions. To be responsive, the partition of the information space (distribution of mediation load according to classification) must be load-balanced. In other words, the bandwidth requirements at any single point in a physical network must remain proportional to the network load as a whole. As the logical focus of messages changes over time, this will require dynamic adjustment based upon a predictive model, itself based on the recent history of the information flow. The extra network load incurred simply by having to organise the splitting of the mediation service across more than one platform must also be allowed for in any load-balancing model.

The mediation requirement of the system is dispersed among the nodes of the distributed mediation network according to the classification imposed over that system. It has, however, been observed that full knowledge of all locations and all predicates is not required by all network nodes (machines). The only requirement for correct operation is that every message eventually arrives at a mediator hosting a mediation task appropriate to the category to which the message belongs.

Mediation services may therefore be moved dynamically, within the mediation network, while the system is operational. This in turn allows the adjustment of the system load within the mediation network, according to dynamically shifting patterns of interest among the system clients. Such patterns of interest may be assessed according to predefined knowledge about the clients, by way of the expressions of interest made by them, or according to analysis of changing use patterns within the system.

Load-Balancing—Handover

The distributed mediation architecture of the present invention is based on an arbitrary topology of nodes: LPP, MR, M and TP. This topology of nodes has the properties described above in relation to the "steady state". This same topology is eminently suitable for the dynamic balancing of loads amongst existing functional components.

Whenever a particular category is deemed to be under heavy load, the hosting of the associated mediation task may be moved to a machine within the network that has spare capacity. The handover of the mediation task also requires dynamic adjustment of the mediation network to ensure that any messages, either currently within the network, or to be received in the future, are diverted to the new mediator node. This may be achieved by the propagation of special messages around the new logical network topology, i.e. a "causal rippling" through the appropriate machines. Mediation change can thereby occur within a live system without affecting the observable behaviour of that system in terms of message input and output.

Mediation change is ultimately possible by virtue of the global invariant property whereby an incoming message will be routed to the same mediator regardless of the LPP from which it emanates. Mediation change poses the problem of changing from one consistent state to another, within a live system, and without adversely affecting the system's correctness or performance. Two main functions of the distributed mediation network must be considered: message propagation and querying, and in particular start-up queries.

To answer queries, it is necessary to know which classification is being applied at any particular time. This allows the discovery of which mediator hosts any given category of message at any given time. However, to do this deterministically for any class of query would require some degree of global synchronisation. As an alternative to global synchronisation, the distributed mediation model is arranged to permit certain classes of query to be answered without perfect global information or synchronisation.

Consider the progression of states from a time in which the system is in a first consistent state PS1 to a new consistent state PS2. At time $t_0$, the process of changing to the new state PS2 commences. At some unknown time after this, $t_1$, the system is known to have changed to the new consistent state PS2. The time $t_b$ when the actual change occurs is unknown but bounded by $t_0$ and $t_1$.

Between time $t_0$ and $t_1$ we define the system as being unstable, meaning that the currently operative apportionment of mediation tasks is not known globally. Each of the system functions however is unaffected, as at each point sufficient local knowledge is available to correctly handle the information flow.

An appropriate algorithm for permitting the underlying partition (classification), as manifested by the apportionment of mediation tasks, to be changed in a running system, is now described. It should be noted that the algorithm is capable of handling the addition or removal of mediator nodes, a functionality discussed in more detail later.

Using, for the sake of clarity, a simplified model in which each message carries a content drawn from a finite set of symbols. The partition (classification) is characterised by a mapping from content tags to a finite set of classes (categories). The classes are named according to their allocated mediator. Changes to the partition are characterised by specifying the reallocation of a content tag to a different mediator.

Also for the sake of descriptive simplicity, it is assumed that: changes only involve two mediators; and one change completes before another begins. Neither of these assumptions is an absolute requirement, but have been made to simplify the model; nonetheless the simplified model is general and allows arbitrary change to be made to the system.

Figure 5A:
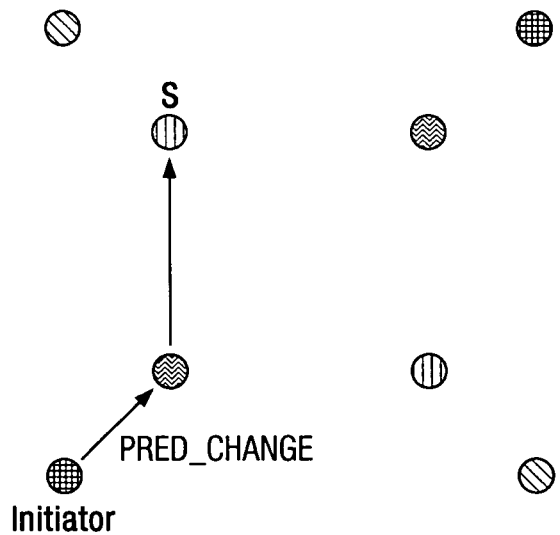
FIGS. 5A to 5F shows the steps of handing a mediation task over from a sending mediator module S to a recipient mediator module R in the "cubic" distributed mediation architecture.

The process begins with a PRED_CHANGE message being sent by some (initiator) LPP to its mediator router (see FIG. 5A). The content of a PRED_CHANGE message describes the reallocation of a content tag to a different, recipient mediator, R. The MR reads this content tag and forwards the message to the mediator, S, currently handling that content.

Figure 5B:
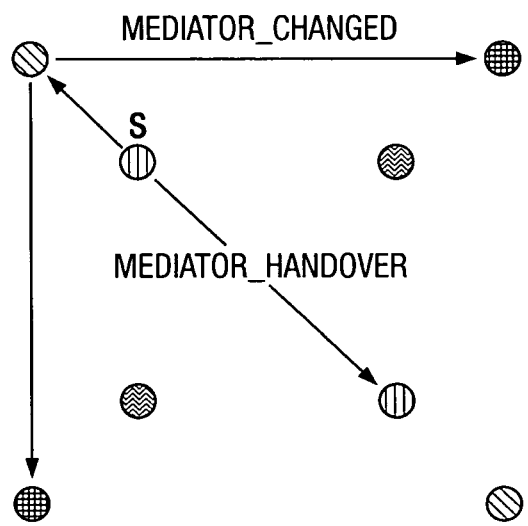
Figure 5C:
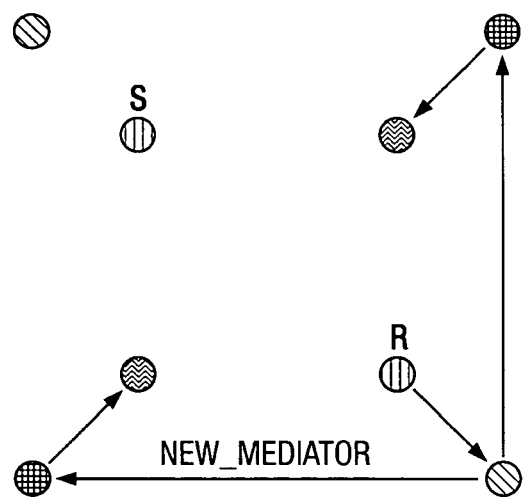

Upon receipt of a PRED_CHANGE message (as shown in FIG. 5B), the mediator:

Changes its state from STABLE to HANDOVER_SENDER.

Sends the handover recipient mediator, R, a MEDIATOR_HANDOVER message containing the content of the PRED_CHANGE message.

Changes its internal state to forward messages containing the content tag to the handover recipient mediator, R, for this change.

From this point onwards any messages sent by any mediator router to the mediator, S, concerning the topic undergoing mediation change will be forwarded to the mediator, R. The purpose of the MEDIATOR_CHANGED message sent to all the mediator's LPPs via the TPs is to ensure causal delivery of messages sent on the downstream network.

When a LPP receives a MEDIATOR_CHANGED message it places itself in the BUFFERING state. When in this state, the LPP buffers all DOWNSTREAM_DATA messages until it receives a NEW_MEDIATOR message for the corresponding content. This is enough to ensure causal ordering of messages forwarded to mediator R and prevent older messages mediated by mediator S from being processed by the LPP out of order.

As shown in FIG. 5, upon receipt of a MEDIATOR_HANDOVER message, a mediator changes its state from STABLE to HANDOVER_RECEIVER denoted by the R label on the mediator node. In this state, a mediator expects forwarded messages whose content match that of the MEDIATOR_HANDOVER message. From the point that the MEDIATOR_HANDOVER message is received, the mediator is mediating that content although the rest of the system may not be aware of this. In order to notify the architecture of a mediation change, the new mediator sends a NEW_MEDIATOR message to all of its TPs. This is a broadcast of mediation change and is forwarded by the TPs to all LPPs and by all LPPs to all MRs as shown in FIG. 5C.

Figure 5D:
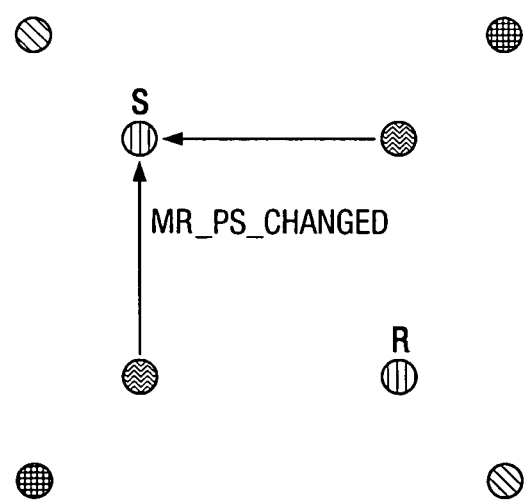
Figure 5E:
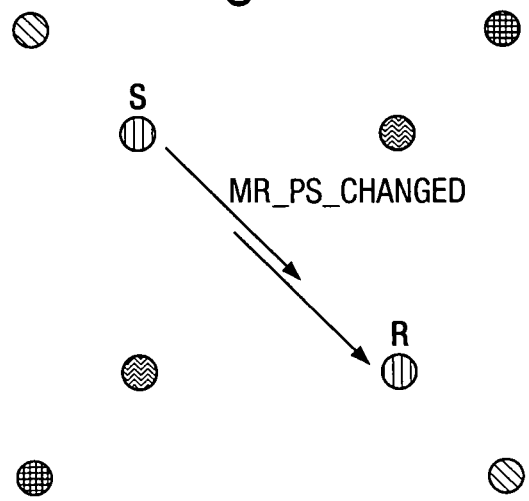

As shown in FIG. 5D, when a MR receives a NEW_MEDIATOR message, it updates its routing table to cause future content matching the payload of the NEW_MEDIATOR message to be sent to the mediator R rather than mediator S. At this point a change in content-based routing has been achieved. However, mediator S must be informed of this event so that it can cease forwarding messages once all MRs are aware of that mediator R is now the mediator of the content. Similarly, mediator R needs informed of these events so that it can return to stable operation and stop expecting forwarded messages. Consequently, after changing its routing table, a MR sends a PE_PS_CHANGED message to the old mediator of the content (S), which it extracts from the routing table before updating it. As shown in FIG. 5E, mediators in the HANDOVER_SENDER state forward all PE_PS_CHANGED messages to the new recipient mediator.

Figure 5F:
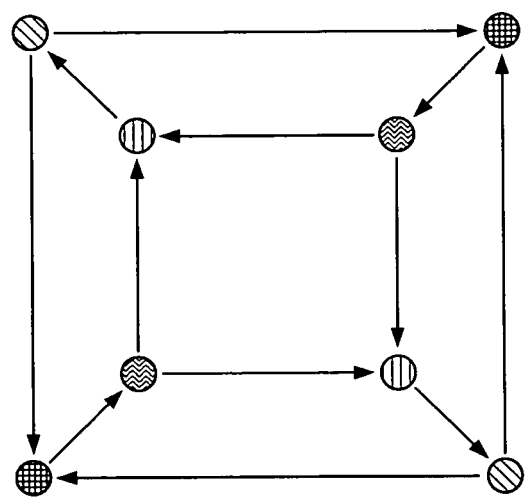
Figure 8A:
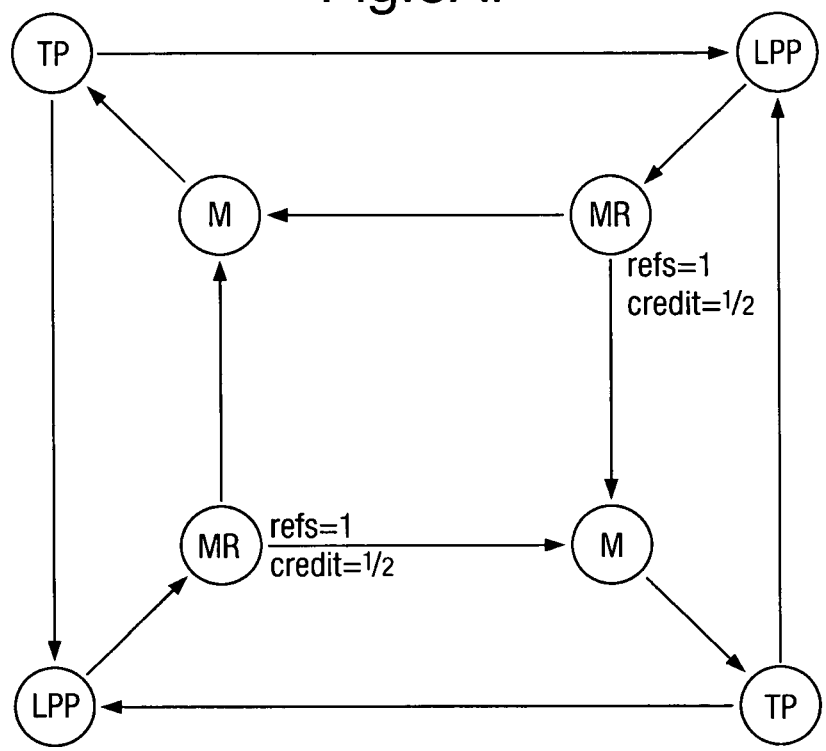
FIGS. 8A to 8E illustrate the steps in adding a new Local Point of Presence (LPP) node to an existing mediation architecture.
Figure 8B:
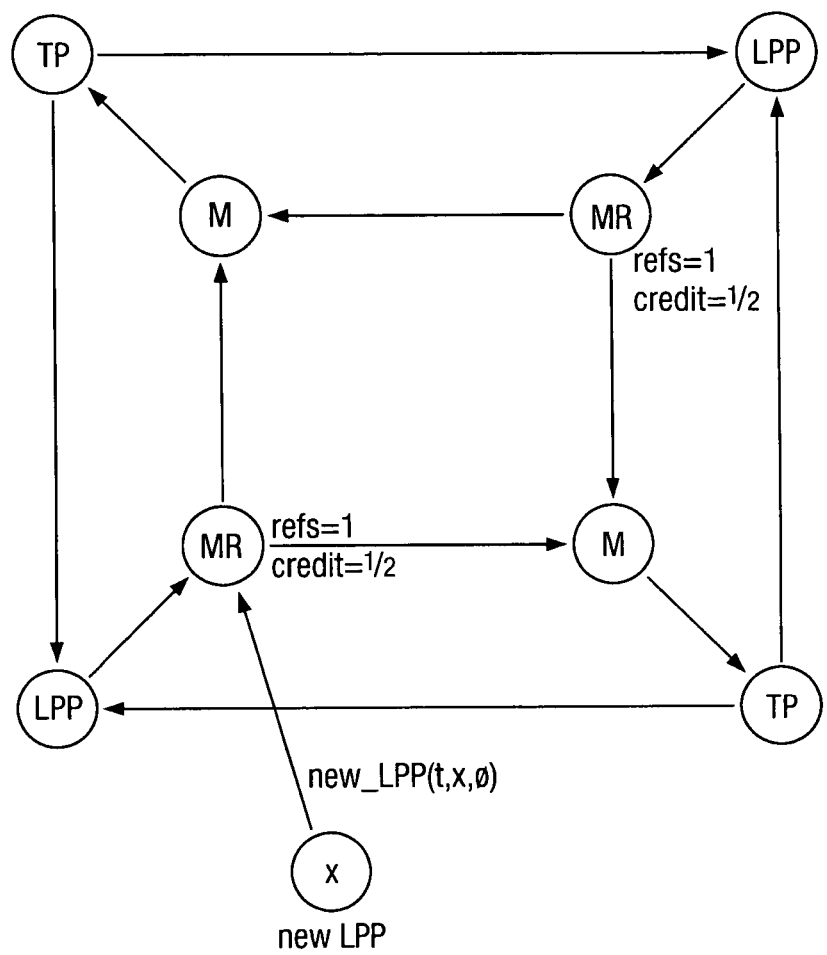
Figure 8C:
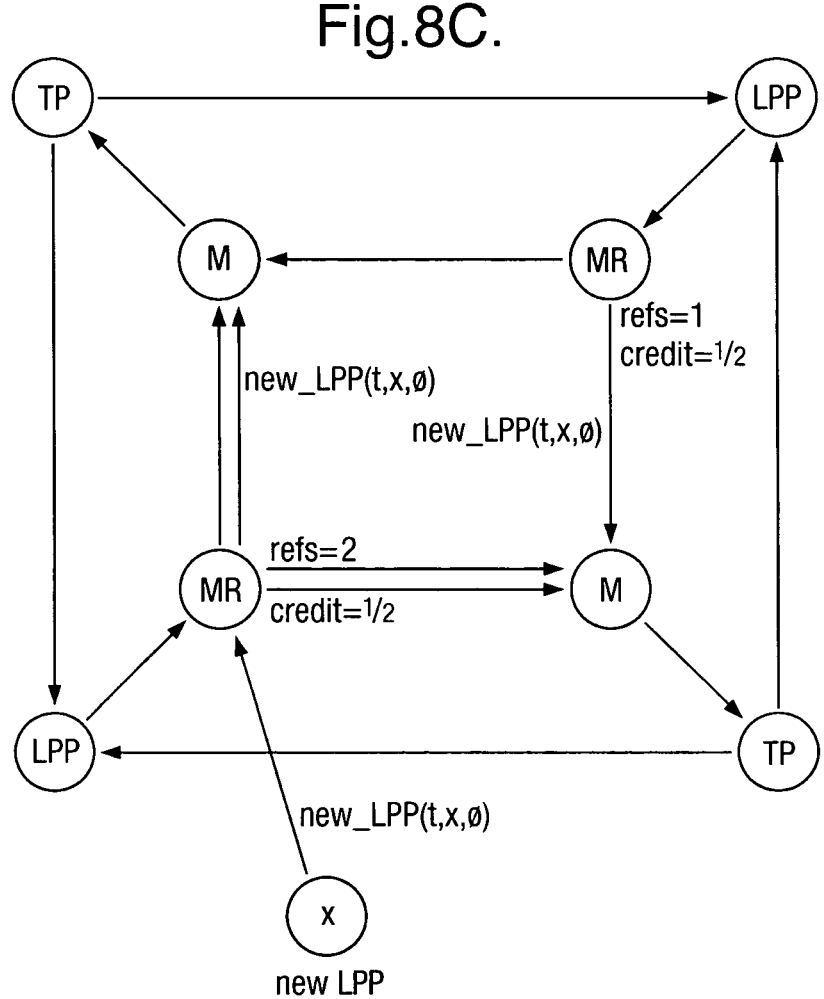
Figure 8D:
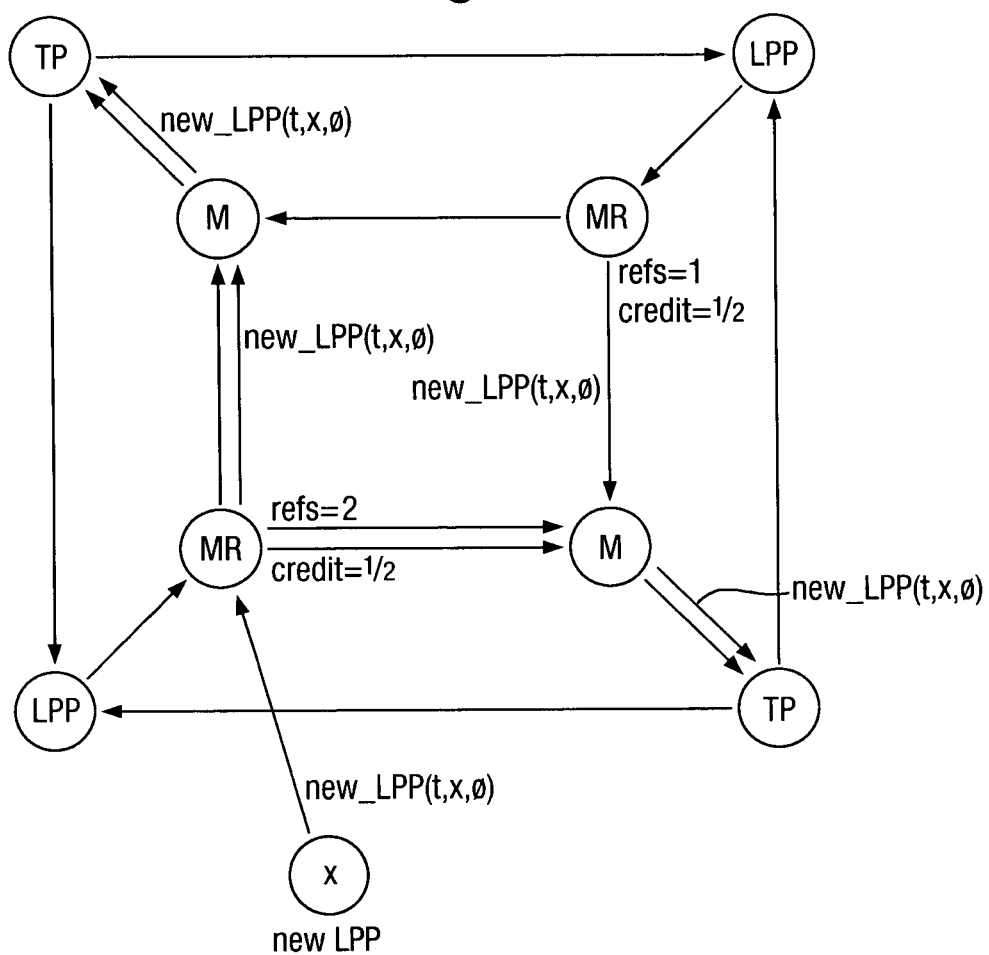
Figure 8E:
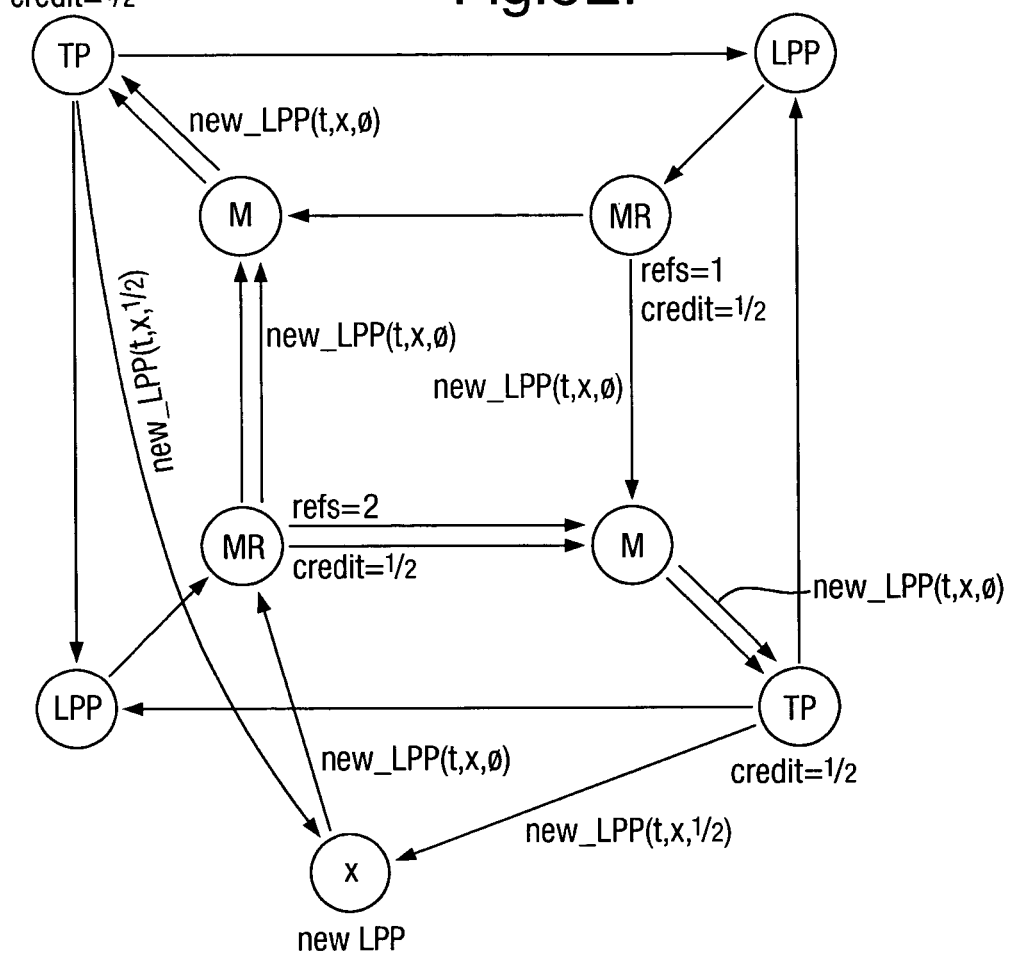
Figure 9B:
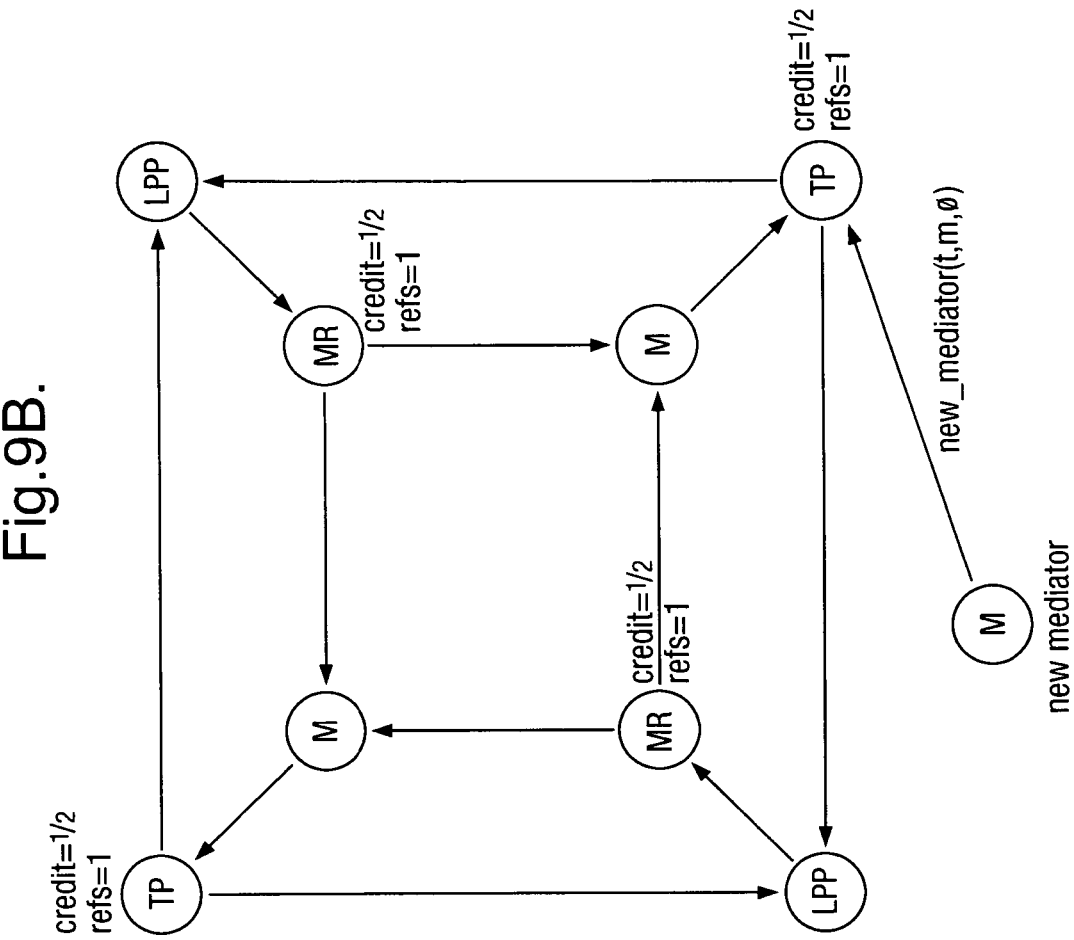
Figure 9C:
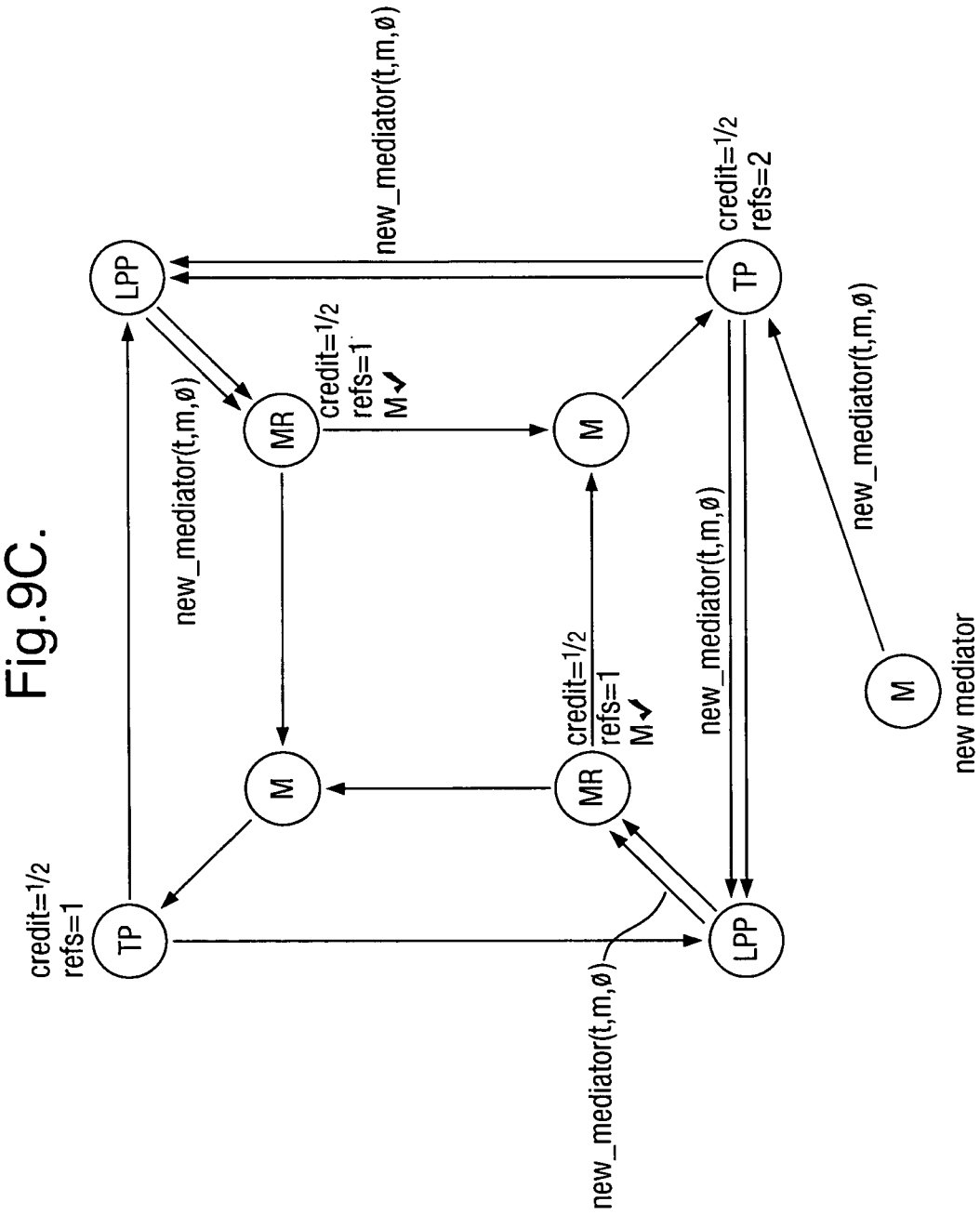
Figure 9D:
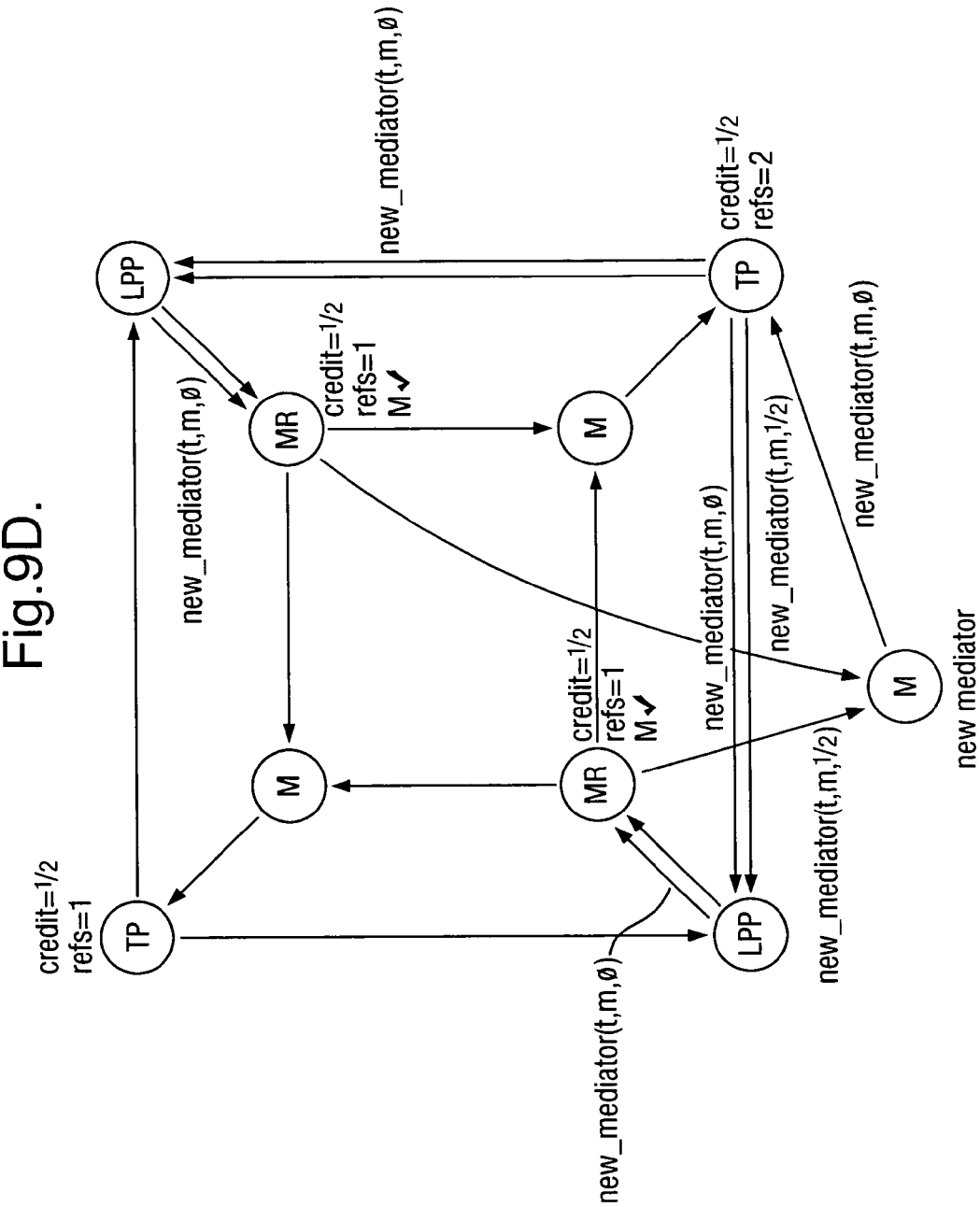

The handover algorithm may use the causal barrier method for maintaining causal ordering with a reference count technique to establish that the messages have propagated around the mediation network correctly. Mediators in the HANDOVER_SENDER and HANDOVER_RECEIVER states count the PE_PS_CHANGED messages received from MRs, which allows them to determine when all the MRs in the system have received the change of mediator information. When they receive the last PE_PS_CHANGED message they change their state from HANDOVER_SENDER and HANDOVER_RECEIVER respectively to STABLE as shown in FIG. 5F.

As can be seen in the description above, the mediator's behaviour is characterised by a finite state machine which may be in one of the following three states.

STABLE—The normal, running state of the mediator; no change is currently undergoing within the predicate set which will result in its handling a greater or lesser equivalence class within the data space.

HANDOVER_RECEIVER—The mediator is in an unstable state, and the size of its equivalence class has just increased due to the reallocation of part of the message space (the delta) from another mediator (the HANDOVER_SENDER). While in this state, it may receive forwarded messages from the mediator formerly responsible for the delta, which it passes on to its transmission proxy as if they had been sent directly to it. It may also receive data messages within the delta directly from any predicate evaluator which has become aware of its new role; any such message must be buffered until it is known that no more forwarded messages from the same source may be forthcoming (via a PE_PS_CHANGED message).

HANDOVER_SENDER—The mediator is in an unstable state, having passed a delta from its former equivalence class to another mediator. Any messages received within the delta must be forwarded to the corresponding HANDOVER_RECEIVER.

The handover algorithm serves very well provided the mediation network has the necessary capacity to mediate the traffic flowing across it. A long lived mediation system, however, may be subject to significant change over its lifetime. Change may occur, for example: in the volume of both subscription and publication traffic; in the number of and geographical distribution of clients; and/or in the locale from which requests originate. Furthermore, as the content of messages changes over time according to change in client demand, the relative proportions of mediation tasks required may alter significantly, rendering the existing partition unbalanced or otherwise inappropriate.

In order to accommodate change, it is necessary for the distributed mediation system to be adaptive. It may be necessary to redeploy physical resource by the addition or deletion of nodes of any kind, at suitable points within the system, to handle changing volumes of traffic within a given geographical domain. As the content of client messages changes over time, the partition applied to the message set to divide the mediation task over the available mediators may require adjustment to balance the mediation load and ensure their efficient use.

In certain mission critical applications such adaptation must be achieved without interrupting the service being delivered.

Provided the above global invariants and dependencies outlined above are preserved, additional functionality will not interfere with the previously defined mechanism. Thereafter, the mediation service can be reallocated dynamically among the existing mediators in accordance with the handover algorithm.

Changes in logical topology of the distributed mediation network can destabilise the service(s) being mediated and may terminate the service being hosted.

A practical distributed mediation network must therefore simultaneously address both load-balancing and stability issues. With certain key additions, the hybrid distributed mediation model described above may be more effectively implemented in practical physical systems. These key additions combine dynamic process migration and appropriate routing in the network infrastructure, thereby permitting effective implementation to be achieved without incurring unacceptably high overheads and unwanted termination in services. The hybrid distributed mediation model must also allow scaling of the architecture without affecting message latency.

Similarly, a distributed mediation system is likely to be implemented on a network infrastructure that is subject to partial failure. Consequently, a distributed mediation system should wherever possible have mechanisms to detect failures and take remedial action.

Wherever possible both of the above requirements should be provided autonomically, that is, without necessity for human invention.

The hybrid distributed mediation model can indeed be extended beyond the load-balancing functionality previously described. The following classes of additional functionality can be implemented over an existing, quiescent, distributed mediation network:

In a first class of functionality, referred to as logical reconfiguration, mechanisms for the (i) addition, (ii), switching, and (iii) removal of individual nodes and node combinations are provided. These mechanisms allow an arbitrary reconfiguration of an existing distributed mediation network, such reconfiguration taking place within a live system without affecting the outwardly observable behaviour of that system. A reconfiguration mechanism is a computer implemented method that allows arbitrary changes to the logical topology of the network beyond the simple handover of mediation tasks between mediators. The result is achieved by the dynamic deployment and/or redeployment of logical nodes over a flexible and changing physical infrastructure. Arbitrary deployment of the logical architecture over an arbitrary network of physical computing devices is therefore possible without any requirement for the service being hosted to be terminated.

A second class of functionality that can be implemented upon an existing distributed mediation network is that of failure handling. Where the behaviour of an distributed mediation network temporarily fails to meet its requirements due to an individual node failure, mechanisms that allow the reconfiguration of the remaining nodes can be defined so that they once again start to behave as the original network did before failure. A failure handling mechanism allows for dynamic discovery of physical node failures within the network architecture. Failure handling mechanisms may then respond by redeploying the logical functionality of the failing node over a different set of physical nodes, not including that known to have failed. This can be achieved by providing further mechanisms to detect the source of failure, and reusing the reconfiguration mechanisms identified above to reconfigure the remaining network. Functionality in this class can also be implemented within a live system without affecting the observable behaviour, in particular, avoiding any requirement to terminate the service being hosted.

In a third class of functionality, referred to as structural refinement, there are mechanisms for allowing the replacement of an individual node or nodes within an distributed mediation network by any other network, including a further distributed mediation network. This structural refinement itself preserves the global invariants and properties required for that node within the distributed mediation network, and again operates within a live system. Structural refinement improves the deployment of generic architectural structures in such a way that single logical nodes may be replaced by whole subnetworks of nodes or other types of nodes of arbitrary size. Deployment need not be a node by node affair.

In all cases, adjustment to the live network is affected by the addition and interpretation of new message types, similar in nature to the totality of types and behaviours as exemplified in the discussion of mediator handover.

Functionality in each of the three main classes is described in more detail hereafter.

Reconfiguration: Addition of Nodes

This section addresses the important facility for the addition of new nodes. In each case, we consider the addition of a either single new node or a pair of new nodes to a network. The addition of new logical nodes may coincide with the addition of new physical nodes (machines). This does not imply any loss of generality since the same principles are equally applicable to the addition of a plurality of nodes or even complete distributed mediation networks. In each case, two aspects must be considered: first, that the new node is correctly configured to operate in its prospective environment (Part A), and secondly that the network into which the new node is introduced is properly configured (Part B).

Any of the following nodes can be added:
  a single LPP
  a single M
  an LPP→MR pair
  an M→TP pair
and the system invariants and dependencies will be maintained. To add a new MR, we must add a new LPP since LPPs uniquely address a single MR. Similarly, with TPs, since mediators uniquely address a single TP. In combination with switching, this is enough to permit arbitrary legal topologies to be constructed. When we add an extra LPP we are providing extra capacity at the client interface. When we add new mediators we are adding extra mediation capacity. Adding MRs increases the input capacity to the messaging system, and adding TPs increases the output capacity of the system.

It will be noted that many of the algorithms require the transmission of (new) node addresses through the network. For example, when an LPP is added to the system, a NEW_LPP message is sent which has a field called new_lpp_addr. New node addresses may be encoded in a variety of ways—for example a (IP address, port address) pair could be used. This is implementation dependent and will not be dealt with further in this document.

The instigation of any given new node message may be amongst other things: a human operator by means of a management interface; a semi-automatic control network that monitors load levels; or an autonomic mediation network control system.

LPP Addition
Part A—New Node Configuration

An LPP only needs to know the address of its addressees (its MR in the standard model). This is a configuration parameter to the initialisation of the LPP. To update the reference count held by the MR, the new LPP must send a NEW_LPP message to the MR. On receipt of this message, the LPP reference count of the MR is updated. This message is also used to initiate the cycle required to configure the network.

Part B—Network Configuration

To add a new LPP, each downstream network must be updated. This requires each downstream network to be individually updated. This can be achieved by propagating a message to each mediator for transmission to the downstream network.

The message format for the addition of LPPs is as follows:
  New_LPP( transaction_no: Large int, // carrying the id of
    this operation
    new_lpp_addr : address, // the address of the new LPP
    credit_bal) // returned credit by TP We use an arbitrary LPP to introduce the changes and call the chosen LPP the originating LPP.

The process is as follows: a New_LPP(transaction_no, new_lpp_addr) message is sent to the originating LPP. The new LPP may start receiving messages at any arbitrary time after this message has been sent. The originating LPP sends this message to its MR which forwards the message to every mediator. Mediators forward the message to their addressees (TPs in the standard model). At this point in the process, knowledge of the new LPP is globally known. To ensure termination of the algorithm, TPs send the NEW_LPP message to the originating LPP with their credit balances. The new LPP sums the credit balance and when this reaches a predetermined value, say 1.0, the process is known to be complete by the new LPP. This process is shown in FIGS. 8A to 8E.

Mediator Addition

The mediator change algorithm is a component of the Distributed mediation model, and serves to permit existing mediators to change their mediation load. However this mechanism cannot simply be extended to support the configuration of a new node or network. Consequently, a separate mediator addition algorithm is required to support the addition of new mediators.

Part A—New Node Configuration

A mediator only needs to know the address of its addressees (its TP in the standard model). This is a configuration parameter to the initialisation of the mediator. To update the reference count held by the TP, the new mediator sends a New_Mediator message (described below) to the TP. On receipt of this message, the mediator reference count of the TP is updated. This message is also used to initiate cycle of dissemination of the existence of the new mediator to MRs.

Part B—Network Configuration

To add a mediator, each addressing MR must be updated with knowledge of the new mediator. The process is similar to LPP addition except the cycle originates at the new mediator.

The message format for the addition of mediator is as follows:

New_Mediator( transaction_no: Large int, // carrying the id of this operation
new_M_addr : address, // the address of the new M
credit_bal) // returned credit by TP The process is as follows: a New_Mediator(transaction_no, new_M_addr) message is sent to the TP for propagation. The new mediator will not start receiving mediation messages until mediation change has taken place. It may however receive maintenance messages at any arbitrary time after this message has been sent. The TP forwards the message to every LPP. The LPPs forward the message to their addressees (the MRs). On receipt of this message, the MRs have knowledge of the new mediator. To ensure termination of the algorithm, the MRs send the New_Mediator message to the new mediator with their credit balances. The new mediator sums the credit balance and when this reaches a predetermined value, say 1.0, the process is known to be complete by the new mediator. This process is shown in FIGS. 9A to 9D.

Mediator Router Addition

As mentioned above, each mediator router must be addressed by a LPP in order to maintain global invariants. A MR cannot exist without a LPP to address it. Therefore a new MR cannot be created without an associated LPP. This constraint does not, however, discount both functions from being hosted by a single physical computer node or even a single program.

Figure 10:
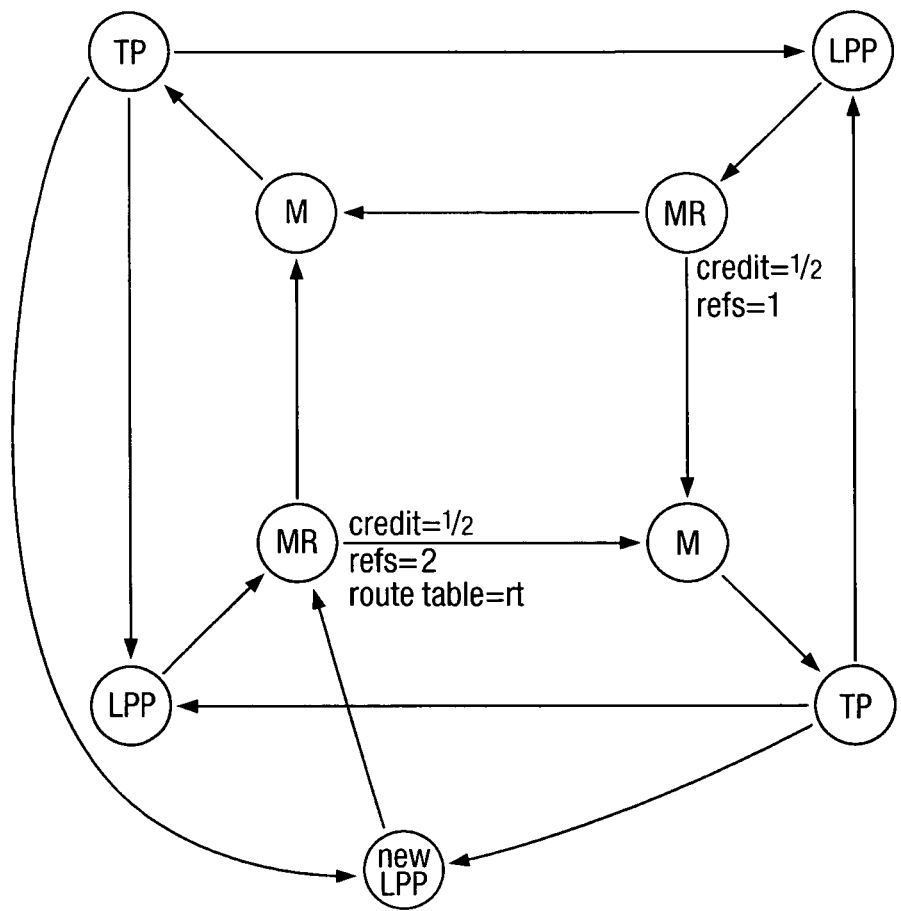
FIG. 10 illustrates the first step in adding a new Mediator Router (MR) node to an existing mediation architecture, the addition of a new Local Point of Presence (LPP) node.
Figure 11B:
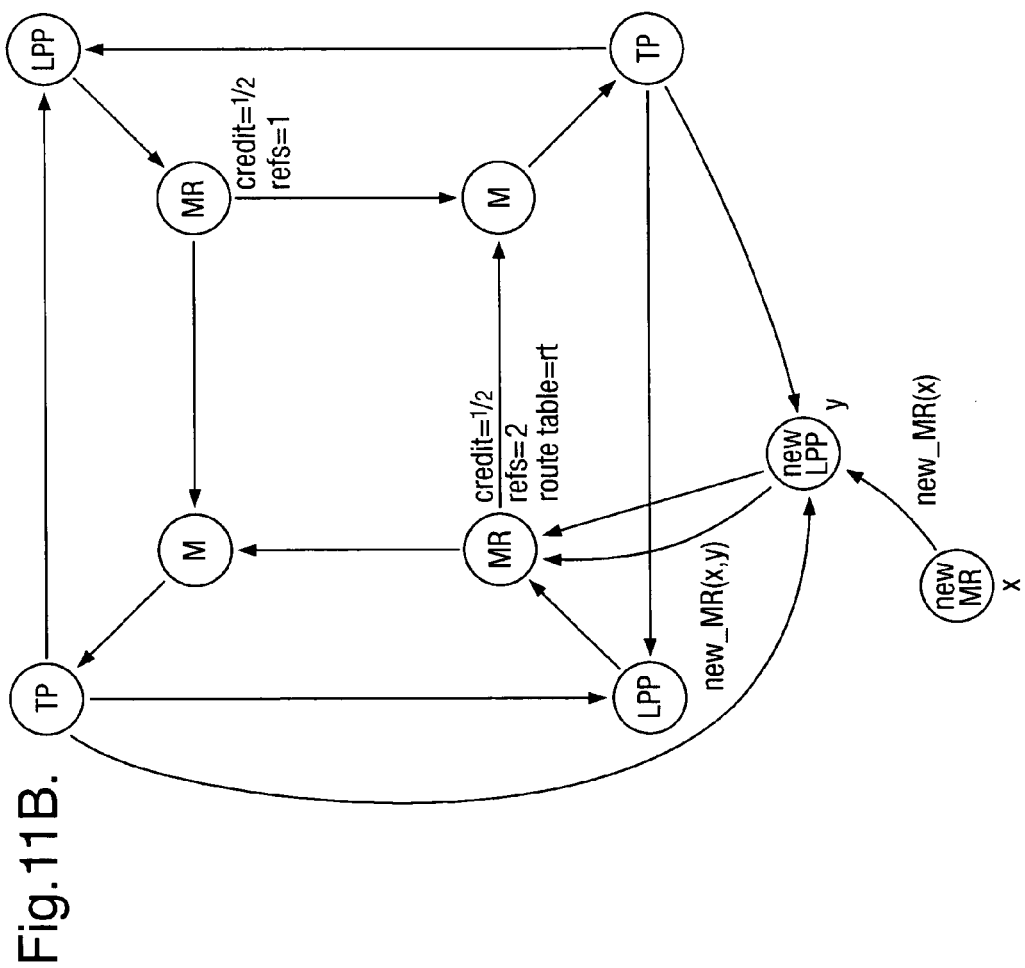
Figure 11C:
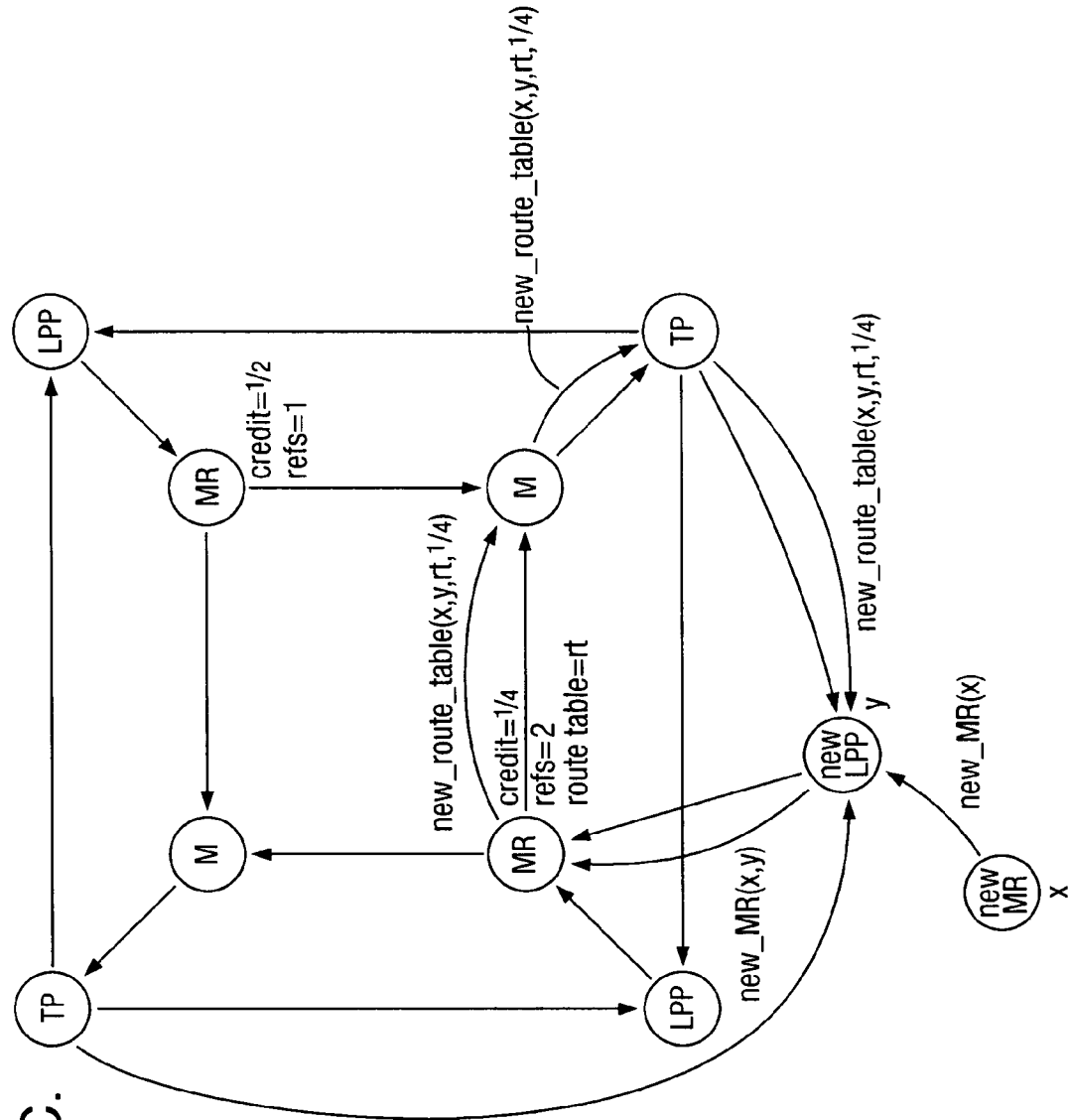
Figure 11D:
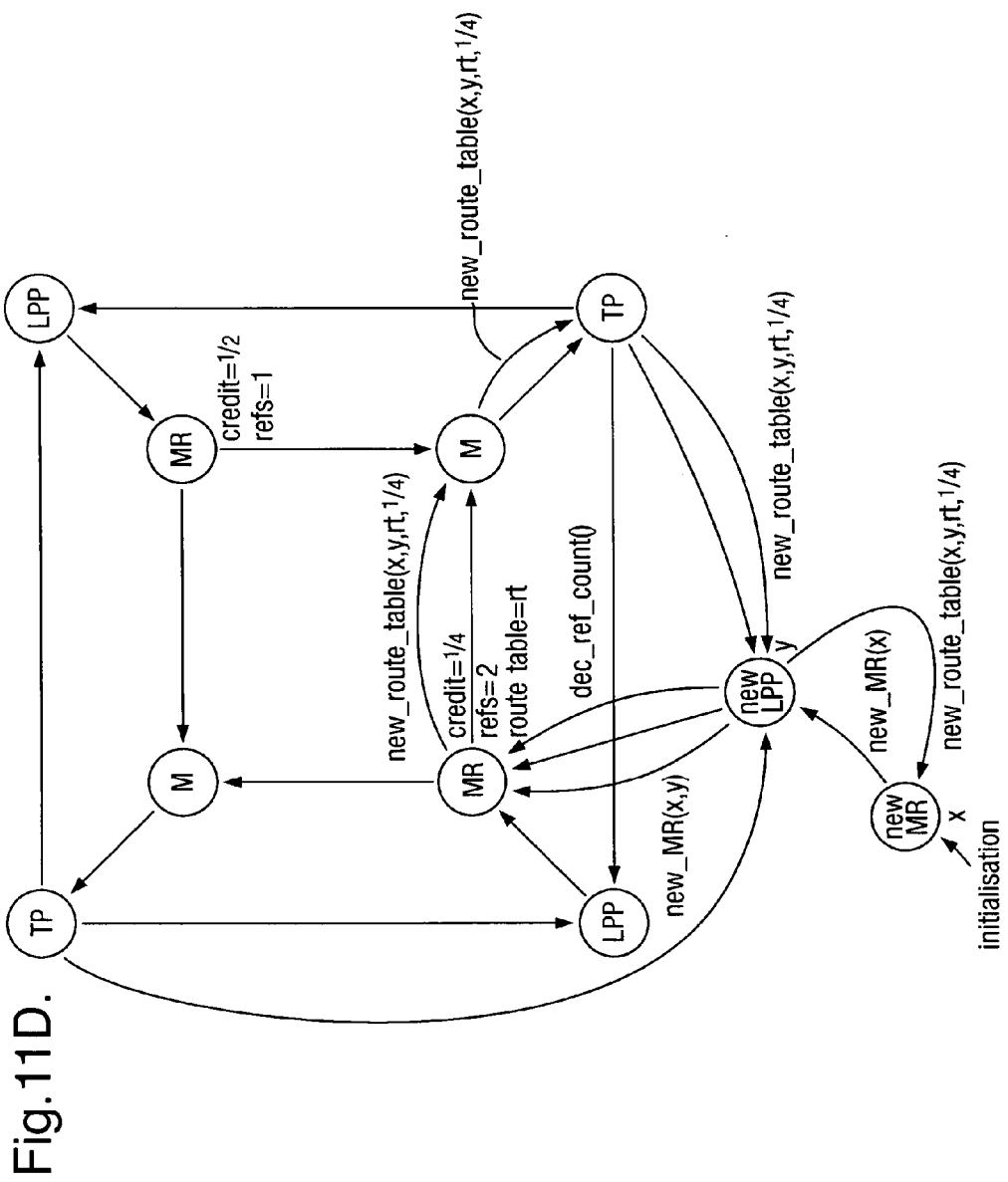
Figure 11E:
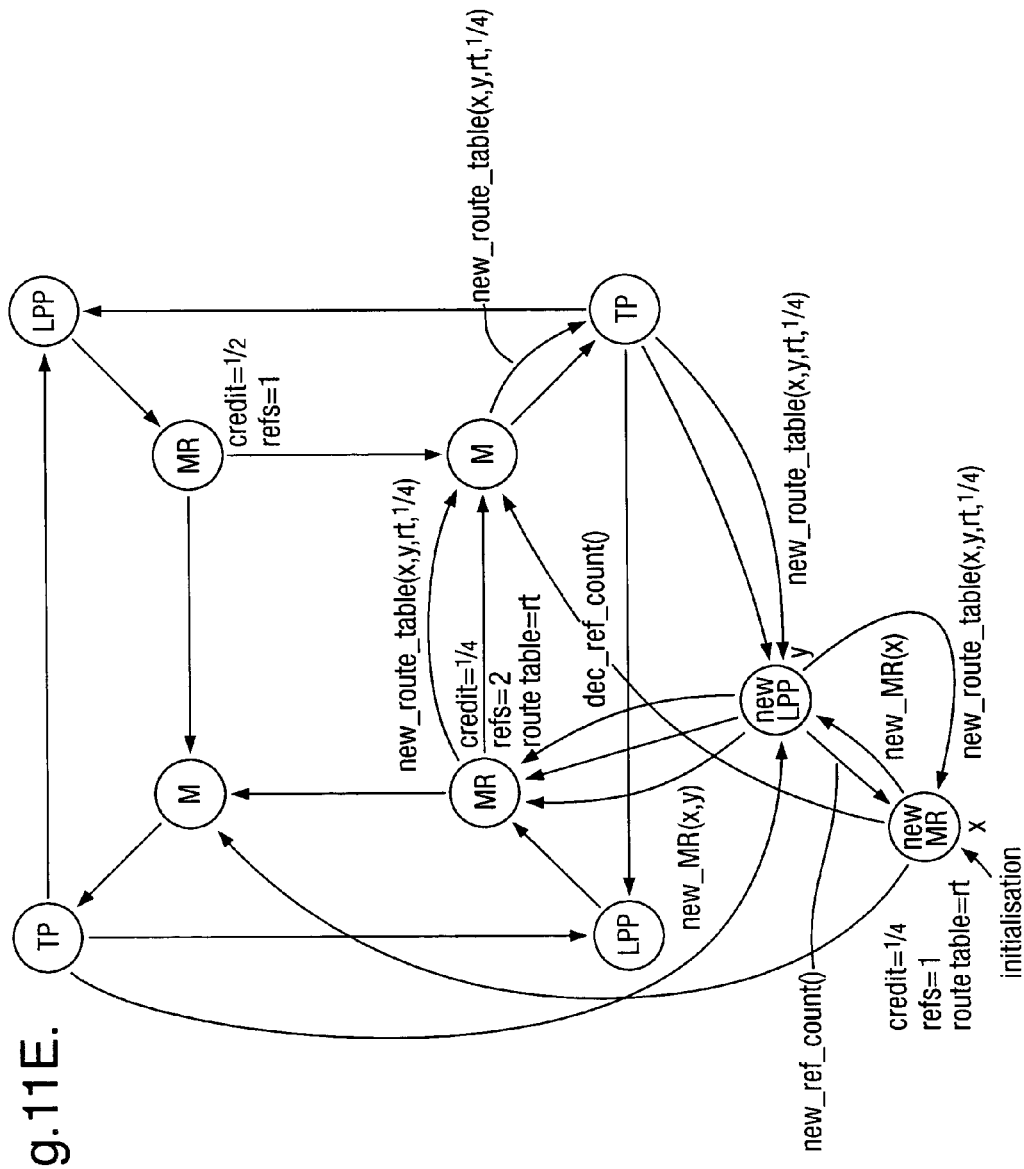

The first step in new MR addition is therefore to create and initialise a new LPP with no clients. This results in the situation illustrated in FIG. 10. Once this situation has been achieved, the new LPP is used to create a new MR.

Part A—New Node Configuration

To operate a MR requires an up-to-date routing map. During stable periods the routing maps are the same for all MRs in the system. Therefore a new MR can get a routing map from any established MR in the system. MRs also require a credit balance which can only be obtained from another MR.

To initiate the process a NEW_MR(new_mr_addr) message is sent to the newly created LPP. The format of the messages is as follows:

```
NEW_MR(transaction_no: Large int,   // carrying the id of this operation
       new_mr_addr : address,        // the address of the new MR
       lpp_addr: address )           // address of the LPP
NEW_MR_ROUTE_TABLE (
       transaction_no: Large int,    // carrying the id of this operation
       new_mr_addr : address,        // the address of the new MR
       lpp_addr: address,            // address of the LPP
       rt: route_table,              // the new route table
       credit_bal )                  // returned credit by TP
```

The LPP adds its own address and sends out a NEW_MR(new_mr_addr, lpp_addr). When this message is received by a MR, it sends a NEW_MR_ROUTE_TABLE message and attaches the address of the new MR, the address of the new LPP, the routing information and a fraction of its credit balance. This message is forwarded to an arbitrary mediator and is passed on the downstream network to the LPP whose address is in the NEW_MR_ROUTE_TABLE message. The LPP then passes the routing map to the newly created MR. The MR uses this information to initialise its credit balance and its routing maps.

Part B—Network Configuration

In order to make use of the new MR, the new LPP needs to change its MR to the newly created one. This process is initiated immediately after the NEW_MR_ROUTE_TABLE message has been received by the new MR. On receipt of this message the new MR send a MR_INITIALISED( ) message to the new LPP. This in turn sends INC_REF_COUNT( ) and DEC_REF_COUNT( ) messages to the new and old MRs respectively. This process is illustrated in FIGS. 11A to 11E.

Transmission Proxy Addition

In order to maintain global invariants, a TP must be addressed by a mediator. A TP cannot exist without a mediator to address it. Therefore a TP cannot be created without an associated mediator. Note that this does not discount both functions from being hosted by a single physical computer node or even a single program. This is the symmetric case to the creation of TPs.

Figure 12:
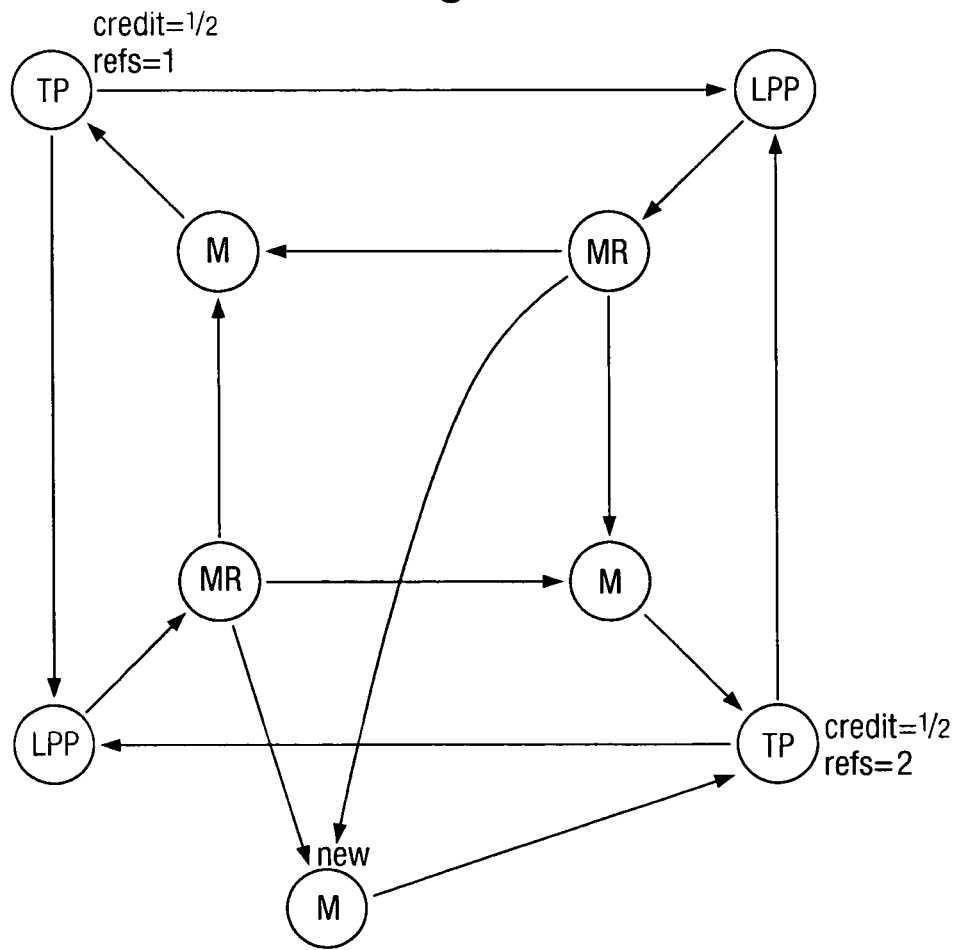
FIG. 12 illustrates the first step in adding a new Transmission Proxy (TP) node to an existing mediation architecture, the addition of a new Mediator (M) node.
Figure 13A:
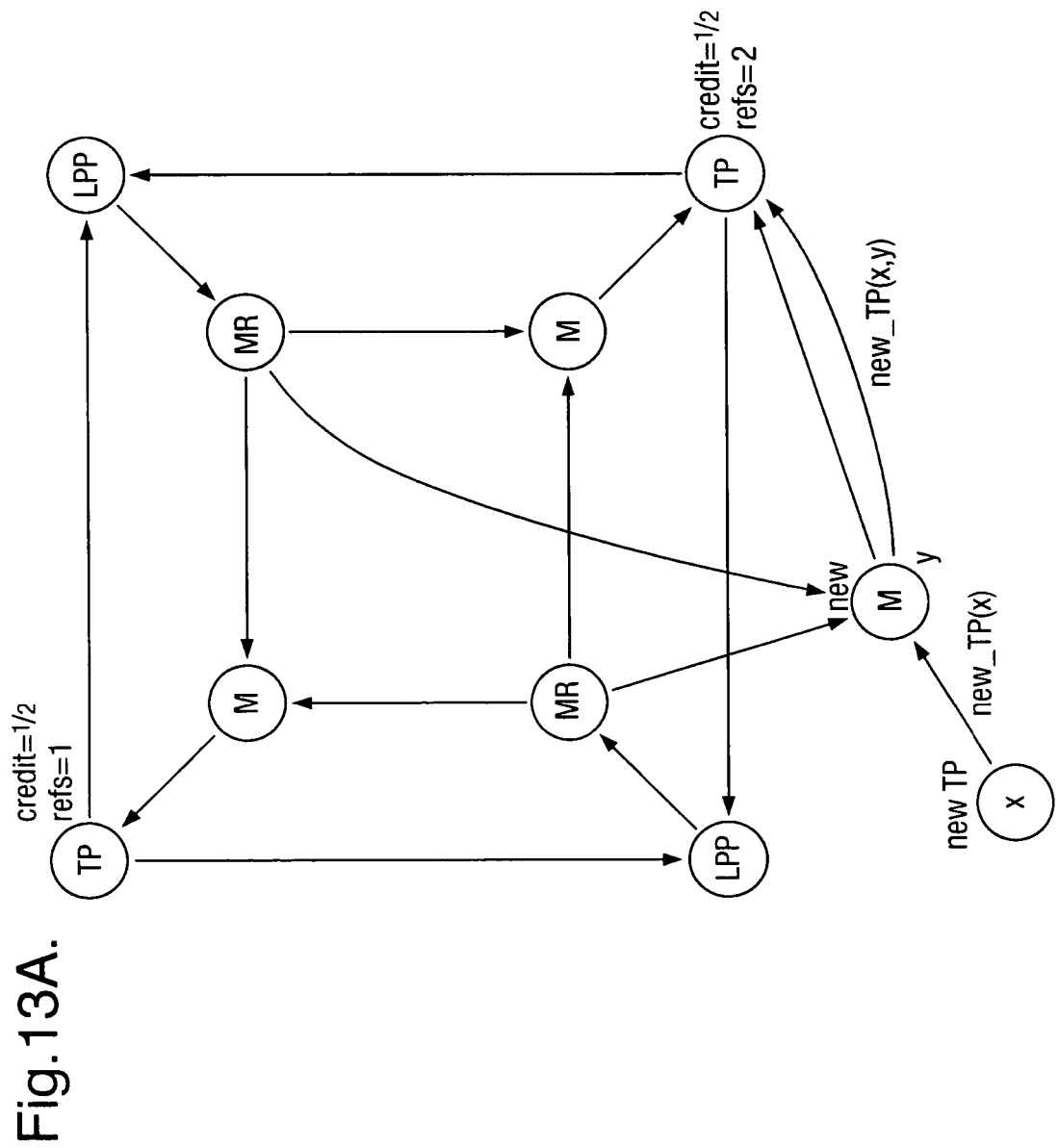
FIGS. 13A to 13E illustrate the next steps in adding a new Transmission Proxy (TP) node to an existing mediation architecture.
Figure 13B:
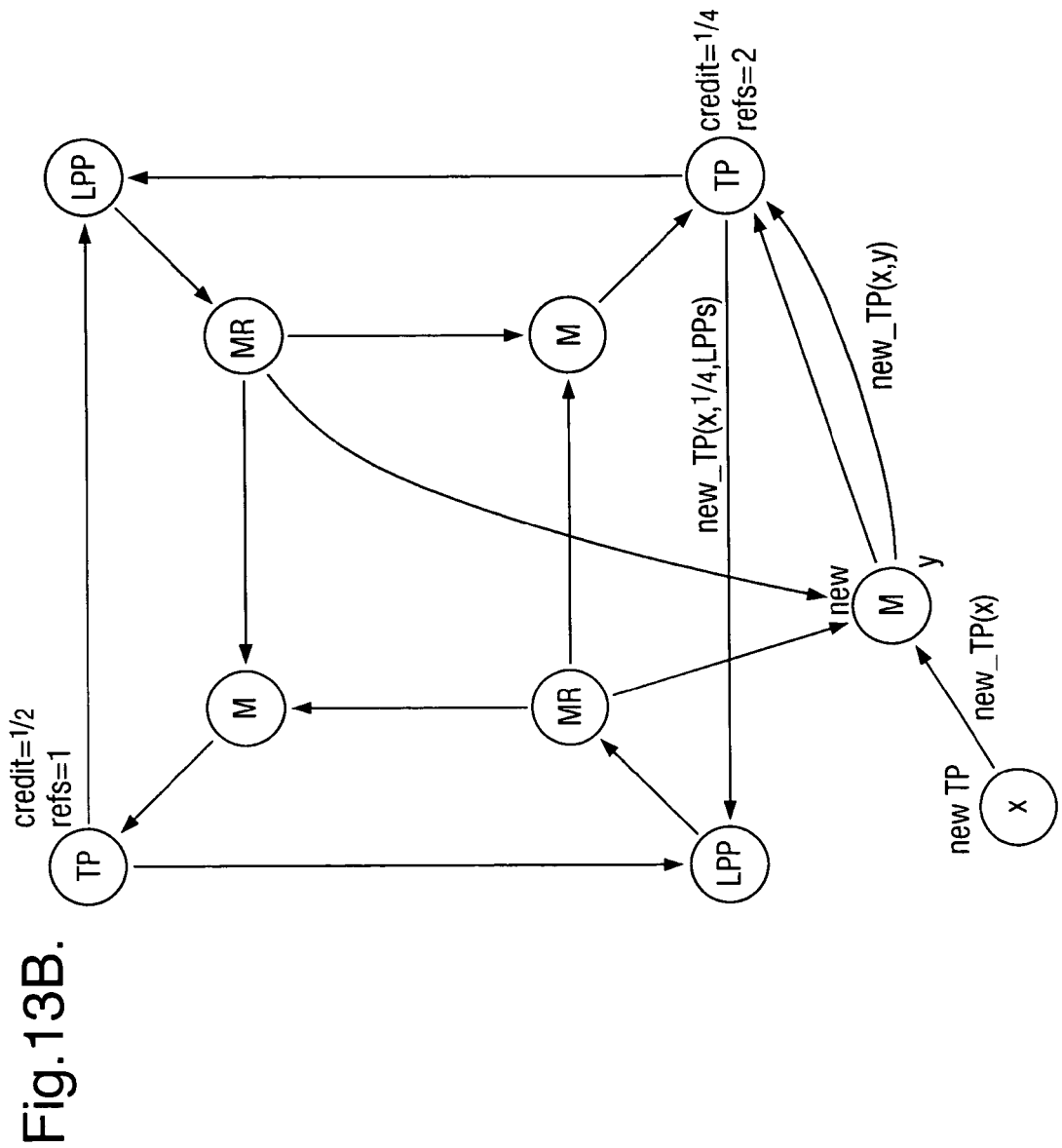
Figure 13C:
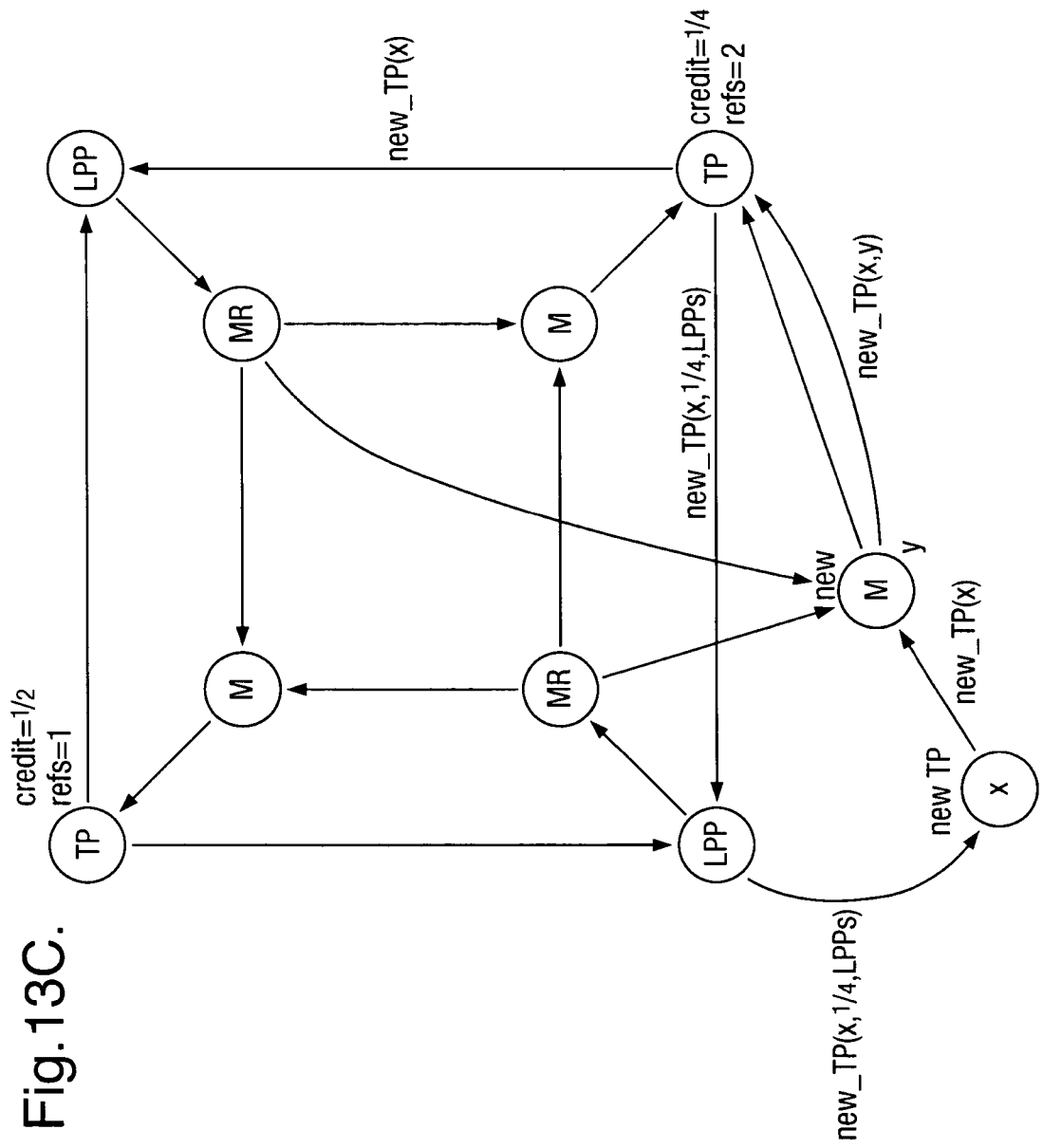
Figure 13D:
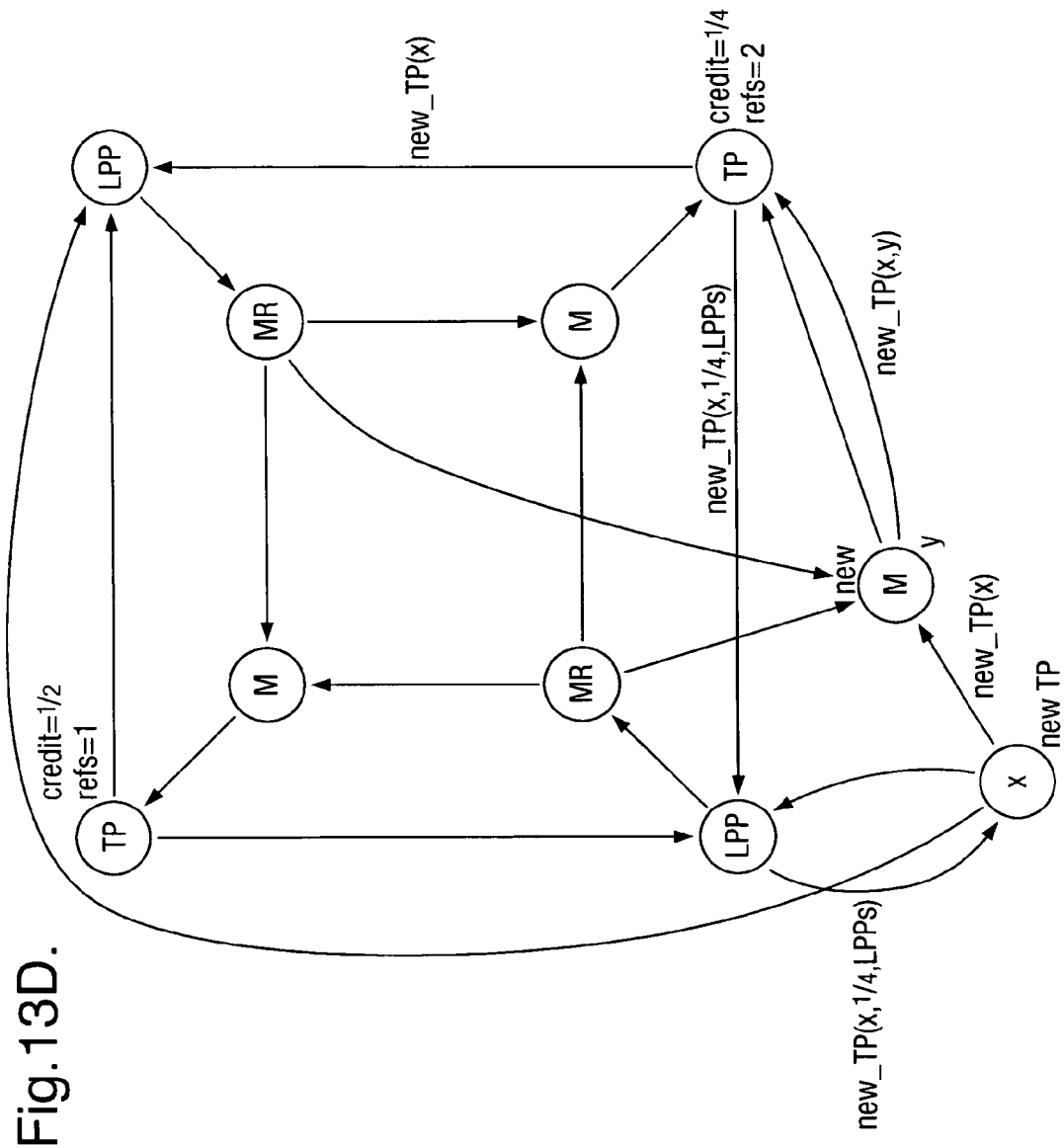
Figure 13E:
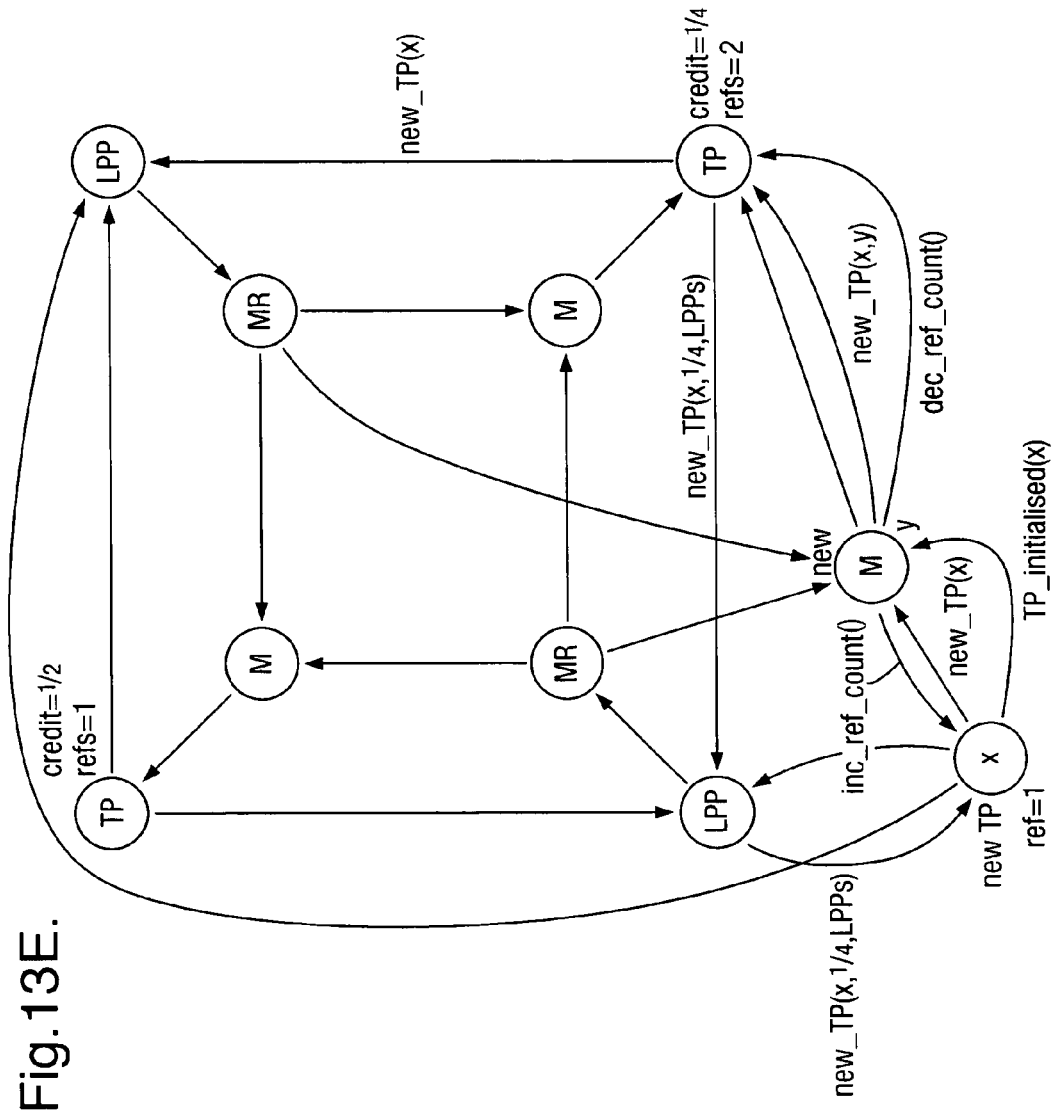

The first step in new transmission proxy addition is therefore to create and initialise a new mediator which is not mediating any data. FIG. 12 illustrates this first step.

Part A—New Node Configuration

To operate, a new TP requires knowledge of all the LPPs in the system. This may be obtained from any other configured TP in the system. TPs also require a credit balance which can only be obtained from another TP.

To initiate the process, a NEW_TP(new_tp_addr) message is sent to the newly created mediator. The format of this message is as follows:

```
New_TP(  transaction_no: Large int,  // carrying the id of this operation
         new_tp_addr : address,       // the address of the new TP
         mediator_addr: address,      // address of the mediator
         LPPS: list[LPP]              // list of known LPPS
         credit_bal )                 // returned credit by TP
```

The mediator adds its own address and sends out a NEW_TP(new_tp_addr, mediator addr). When this message is received by a TP, it forwards the message containing the address of the new TP, the address of the new mediator, the list of known LPPS and a fraction of its credit balance. This message is forwarded to an arbitrary LPP. The LPP then passes the routing map to the newly created TP. The TP uses this information to initialise its credit balance and its list of known LPPs.

Part B—Network Configuration

In order to make use of the new TP, the new mediator needs to change its TP to the newly created one. This process is initiated by the new TP sending a TP_INITIALISED( ) message to the new mediator. On receipt of this message, the new mediator sends an INC_REF_COUNT( ) message to the new TP and a DEC_REF_COUNT( ) message to the old TP. The steps involved in both parts of the transmission proxy addition process are illustrated in FIGS. 13A to 13E.

Reconfiguration: Switching Nodes

By switching, we refer to changes in the topology where an outgoing arc from one node is redirected to another node. Switching is therefore only applicable to outgoing arcs from LPPs and mediators since both TPs and MRs have an invariant set of addressees.

The switching targets are either MRs or TPs. The behaviour of these nodes is independent with respect to the identity of their addressers. Therefore the only requirement for switching to maintain a coherent system is that the reference counts are correctly adjusted between the referent machines.

Switching will occur atomically with respect to the addresser machines (the LPPs and mediators) therefore data may continue to flow during the switching operation. During the switching operation the reference counts may be temporarily incorrect but this is harmless with respect to the algorithms.

The LPP being switched sends a SWITCH_MR message to its current MR with its own address and the address of the new MR as parameters. On receipt of this message, the MR checks its reference count. If the reference count has reached a predetermined threshold value, say 1, the MR replies with a SWITCH_MR_FAIL message. Otherwise, it replies with a SWITCH_MR_OK message having decremented its reference count. On receipt of this message, the LPP switches its MR to the new MR and sends a SWITCH_NEW_MR message to it. On receipt of this message, the new MR increments its reference count.

The SWITCH_MEDIATOR algorithm is the same: the mediator being switched sends a SWITCH_TP message to its current TP with its own address and the address of the new TP as parameters. On receipt of this message, the TP checks its reference count if the reference count has reached a predetermined threshold value, say 1, the TP replies with a SWITCH_TP_FAIL message. Otherwise, it replies with a SWITCH_TP_OK message having decremented its reference count. On receipt of this message, the mediator switches its TP to the new TP and sends a SWITCH_NEW_TP message to it. On receipt of this message, the new TP increments its reference count.

Reconfiguration: Removal of Nodes

With two preconditions, global invariants can be conserved as nodes are removed. Firstly, LPPs and mediators may be removed as individual nodes so long as they have no functional implication within the network: in the case of LPPs there should be no functional clients, and in the case of mediators there should be no mediation task on that mediator. Secondly, nodes for removal must not be the sole addressers of their addressees.

The requirements for removal then relate solely to the topology invariants, and the removal task requires the update of each precursor to de-register the node's presence.

MRs and TPs may not be removed in isolation for the same reasons that they may not be created in isolation, and must therefore be removed in a pair along with a sole precursor. For functional reasons, they may not be removed if precursor machines are relying on their presence. Consequently, a MR may only be removed if it (a) has a single LPP addressing it, and (b) that LPP has no clients. At that point, the LPP and the MR may be removed as a pair. The removal of this pair has precisely the same requirement as the removal of the sole LPP.

Similarly, a TP may only be removed if it (a) has a single mediator addressing it, and (b) that mediator has no mediation task associated with it. At that point, the mediator and the TP may be removed as a pair. The removal of this pair has precisely the same requirement as the removal of the sole mediator.

In all cases the removal of a node requires the adjustment of credit balances or reference counts.

Failure Recovery

This section addresses algorithms for handling failure within a mediated routing infrastructure. Mechanisms are provided for detecting failure, for relocating and recovering any of the node types, and for reestablishing connections.

For ease of description, the following assumptions are made:
the failure model is "non-overlapping"—that is two concurrent failures do not occur and each failure is corrected before another occurs.
each node is hosted on a different physical machine.
any two machines may establish a connection, a source of failure being the dropped connections between machines which may be re-established.

Figure 14:
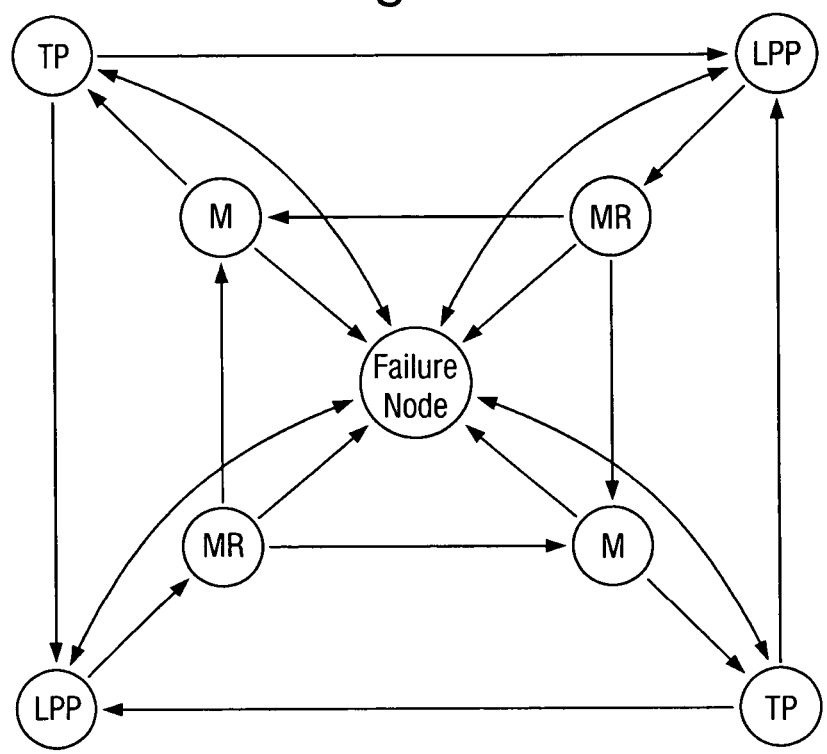
FIG. 14 shows the reporting of failure from the mediation architecture of the present invention to a Failure Handling (FH) module.
Figure 15A:
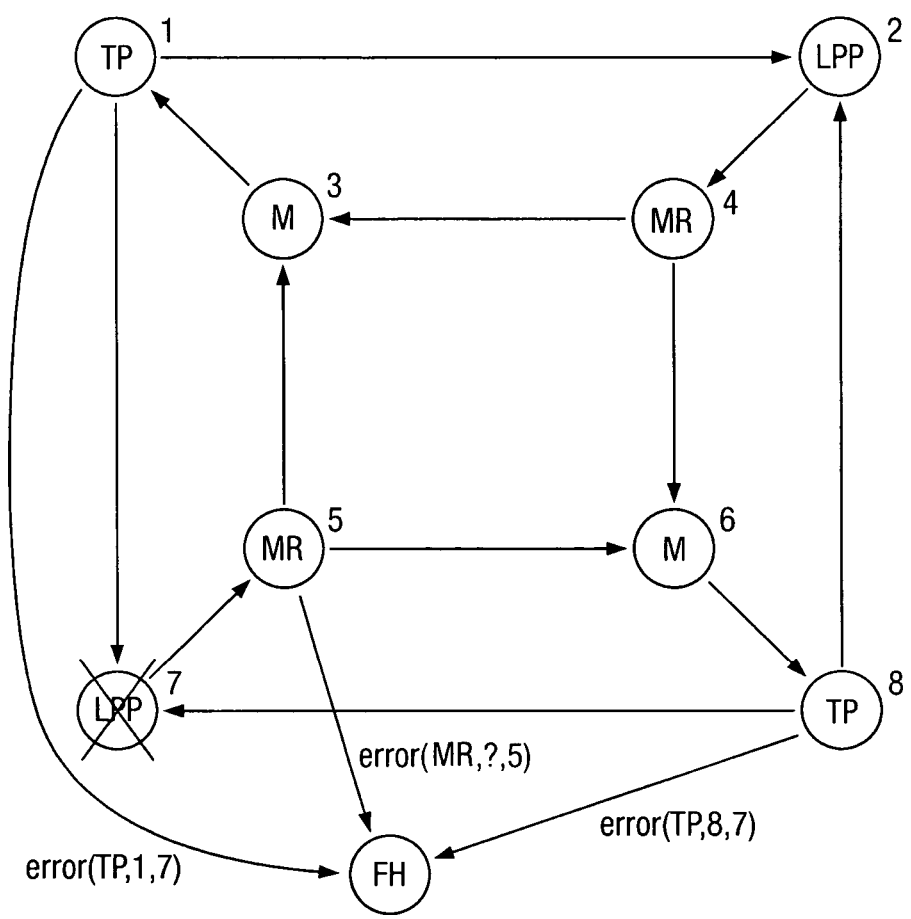
FIGS. 15A to 15E show how the Failure Handling module initiates the rerouting of mediated messages from a failing LPP node to a new LPP node.
Figure 15B:
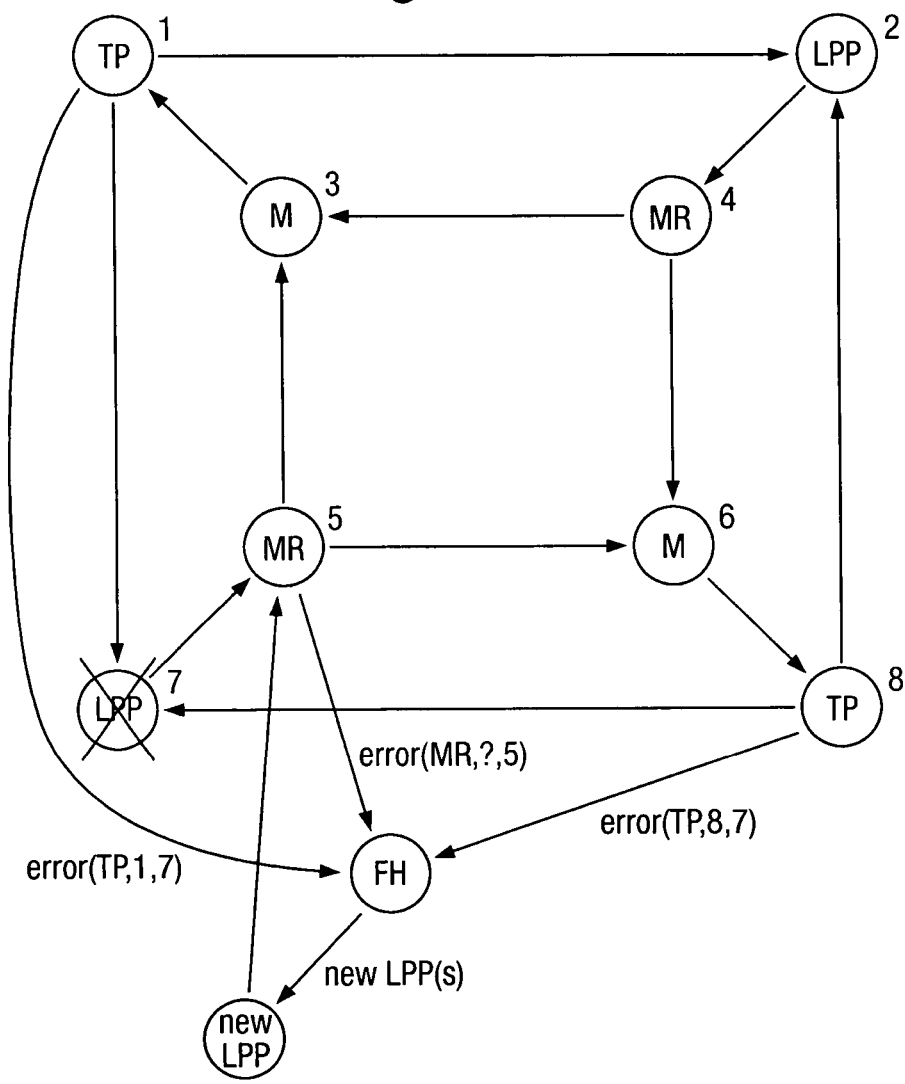
Figure 15C:
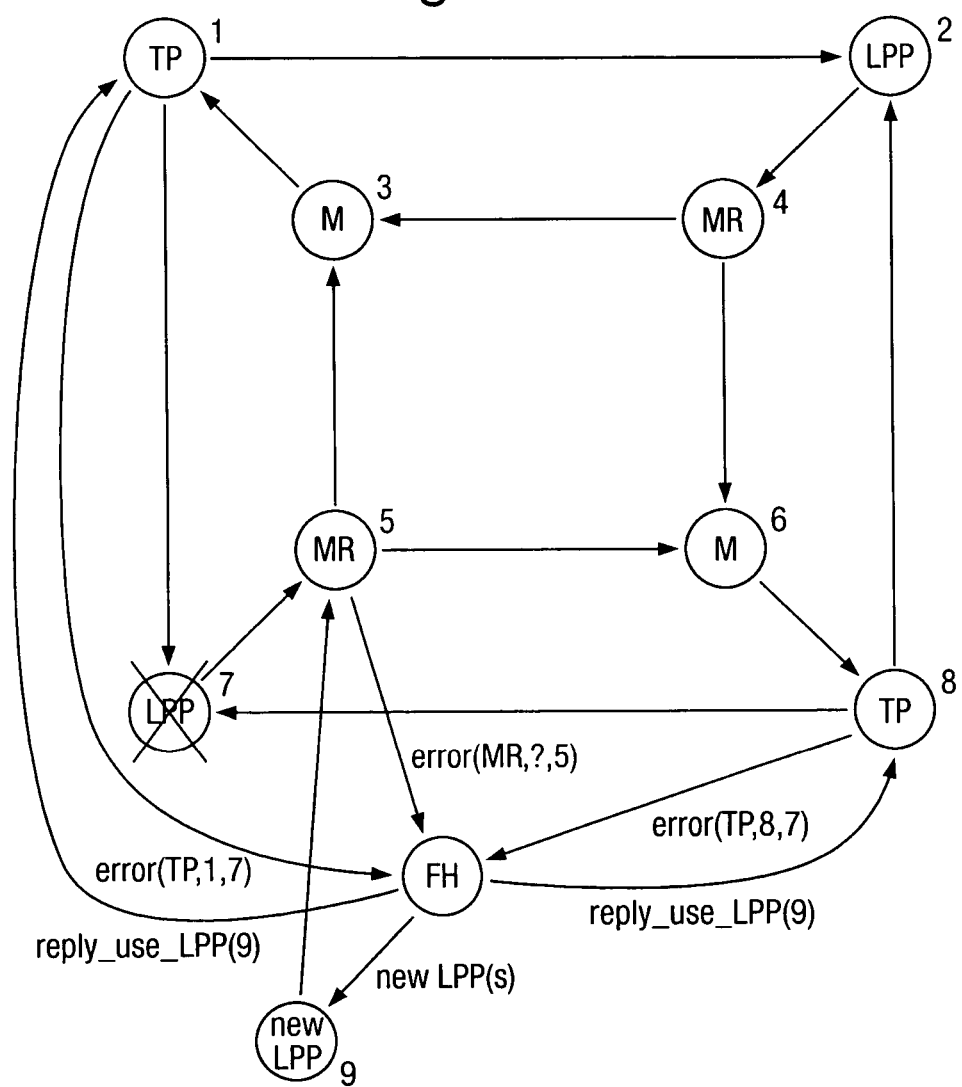
Figure 15D:
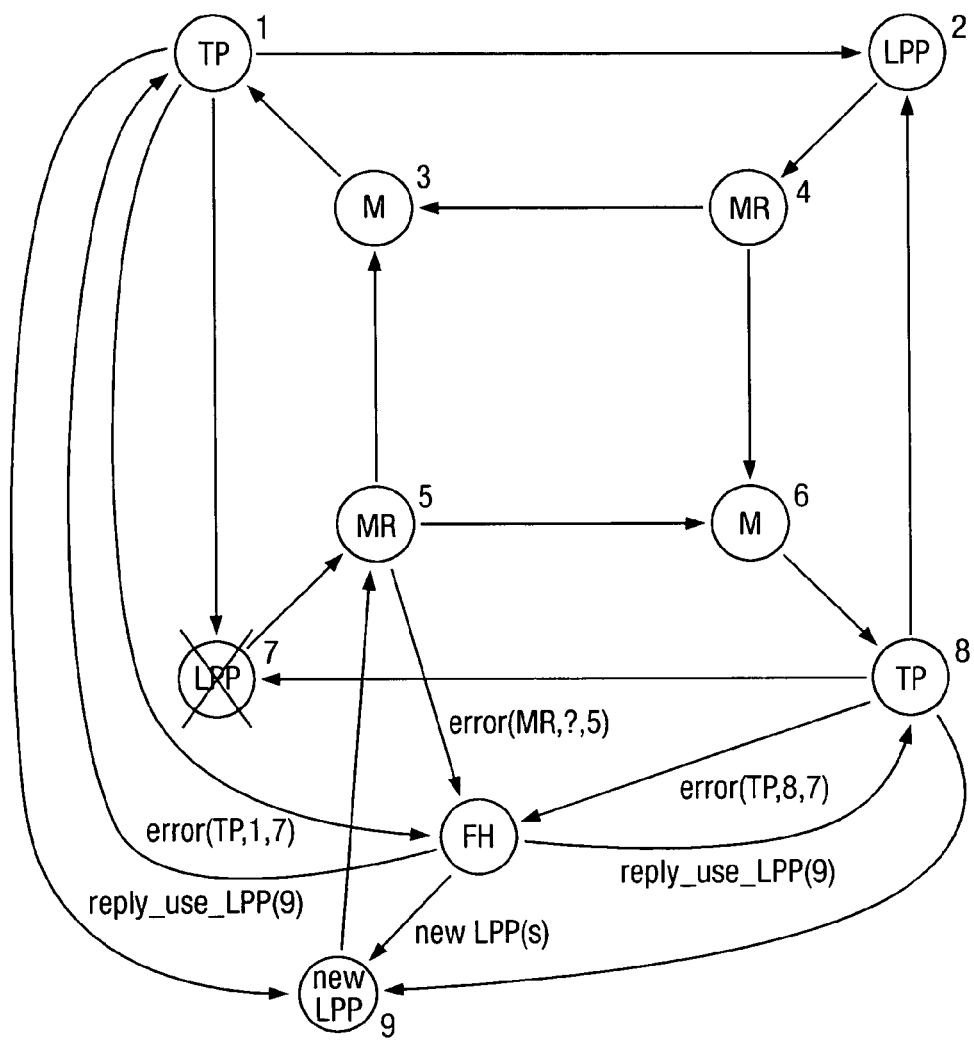
Figure 15E:
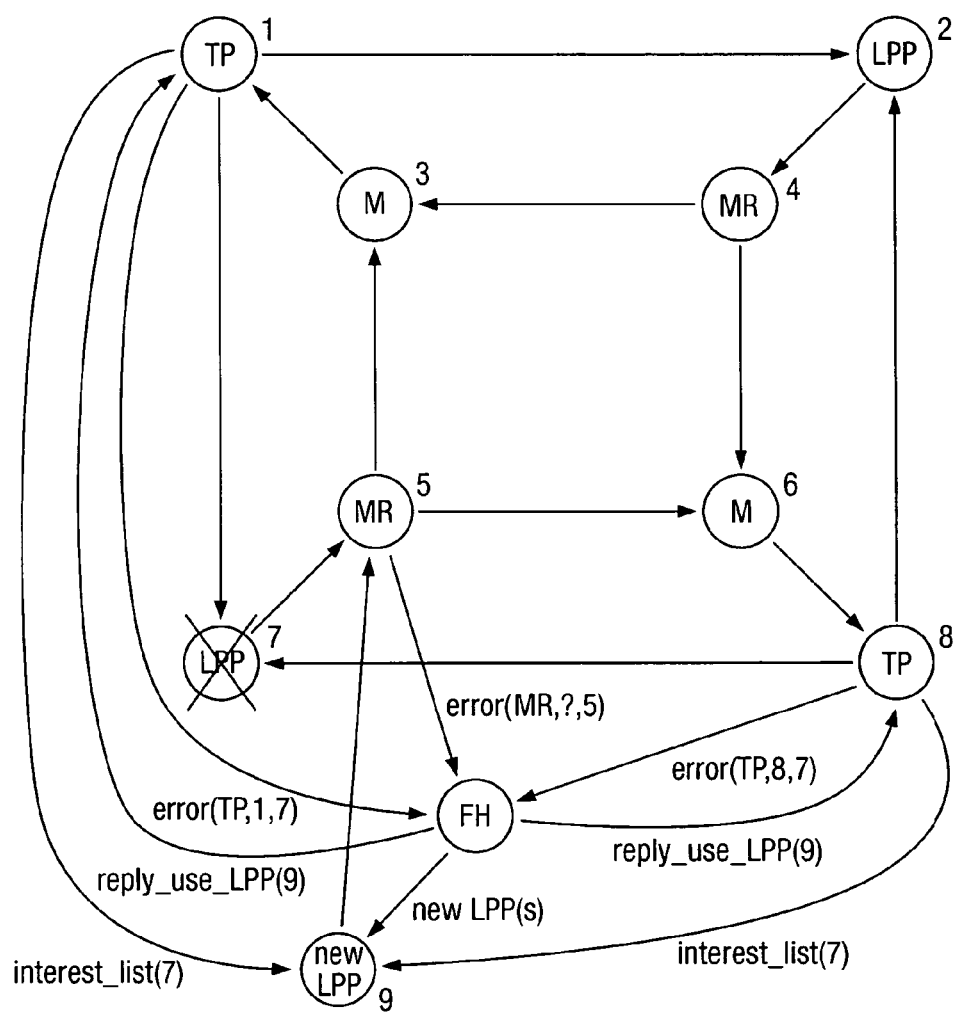

Furthermore, it is assumed that a single failure detection node that is not part of the distributed mediation network is provided. In practice, this failure detection node could be implemented as another distributed mediation network. Each node is able to connect to the failure detection node and report failures in the system as shown in FIG. 14.

Each node is able to detect the failure of incoming or outgoing communication links and report the failure to failure detection node.

Error detection messages have the following form:
ERROR(sending node type, from_address, to_address)

In the case of a failure of an incoming link or referencing machine, the from address is unknown. In the case of a failure of an outgoing link or a referenced machine both addresses may be supplied. If a link failure occurs, only the sender and receiver will report a failure. Furthermore the to address of the sender will match the from address of the receiver which will conclusively indicate a link rather than node failure. In this case, the failure detection node may instruct the sender to reestablish the link. If a node fails, all links to and from that node will fail and will consequently be reported to the failing handling node. The information sent to the failure handling node may be used to determine the type and identity of the failing node as shown in the failure matrix (FIG. 7). Consequently, the failure handling node is able to detect and identify the class of error and where it has occurred.

Our simplifying assumption is that nodes are not co-hosted and are therefore a single physical machine failure can only cause a single logical failure. We note that this assumption may be significantly weakened and still allow the detection of characteristic failure patterns such as those listed for single logical nodes. In particular, if we assume that only pairs of connected nodes are co-hosted, the failure may be detected. The failure handling process is illustrated in FIGS. 15A to 15E.

Recovery Strategy

For any single node failure, the basic strategy is to create a new instance (or use a hot spare) of that node type and reconfigure the network to use it. This requires either: knowing or recreating the node's internal state and equally either knowing or creating its immediate neighbourhood topology. The second of these tasks (the immediate neighbourhood topology) is captured by the totality of error messages sent to the failure handling node in the event of failure.

Topology recreation is carried out both at nodes that send to failed nodes and at nodes that receive from failed nodes. In the former case, whenever a node sends an error message, in which both the from and to fields are specified, the failure detection node replies with the identity of the replacement node. This returned node id is used to overwrite the entry in the node's internal state referring to the failed node, and at that point this node can continue with normal operation.

In the case of receivers from failed nodes, part of the internal state of the failed node will always include the identity of the upstream node reporting the failure(s). In the case of LPPs and Ms, this is a single node the identity of which can be detected from the error message sent by the node immediately downstream of the failed node. This state can be used at the creation of the replacement node.

In principle, the topology around failed MRs and respectively TPs can equally well be recreated from the totality of error messages received; however a similar argument exists to the use of the credit recovery algorithm in preference to simple reference counting as described elsewhere, and for this purpose we note that the totality of outgoing edges is identical for all MRs and respectively TPs in the network; therefore a copy of this state may be acquired from a live node of the appropriate type, as in the reconfiguration mechanisms described elsewhere, to avoid excessive network traffic.

The semantic content must also be recreated in addition to the topology. In other words, all node types carry further internal state information that must somehow be recreated. This further internal state information falls in the following fields: reference counts, interest lists, credit balances, and mediation state.

Reference counts are ascertainable from the sum of error messages received, noting that this is local information and therefore should not present an unacceptable cost. Furthermore, this information is not required for the live running of the system, including for mediation change, and therefore is not required to be in place for continuation, but only before another failure or a controlled reconfiguration.

LPPs carry lists of which mediation topics their clients are interested in; TPs carry lists of which LPPs have interest in the mediation topics they service. Therefore, the sum of interest list knowledge is the same over the set of all LPPs and the set of all TPs. In the case that a TP has failed, the node's interest list may be recreated in principle by knowledge contained in the LPPs addressed by it. In the case that an LPP has failed, the node's interest list may be recreated in principle by knowledge contained in the TPs that address it. It is noteworthy that live operation in both cases may recommence immediately the network topology has been recreated, by ensuring that all messages are transmitted from a new TP to all LPPs; the presence of interest lists at the TPs is purely for optimisation purposes, and the presence of interest lists at the LPPs is purely to allow these to be recreated on failure.

Credit balances are maintained by MRs and TPs for the purpose of detecting termination for mediation and topology change algorithms; immediately it may be observed that live system operation may recommence, in the absence of these activities, immediately upon topology recovery. To recover credit balances, it is possible to maintain the credit balance state of each such node within the mediation architecture itself. Whenever a credit balance is assigned, the information capturing the new credit balances of the two affected nodes is sent into the mediation network and is stored by some mediator. This information may be recovered using a normal query message into the network and the new node's credit balance.

In the preceding discussion, the distributed mediation model requires mediators to maintain a message log; this is intended to be illustrative only, rather than a literal interpretation of the system, the log being a totally general model that will support in principle any mediation task. In practice, it is unlikely that this would the optimal representation for any mediation task. It is therefore likely the mediators would act as gateways to a (external) application APIs. In this case, the mediator nodes themselves would carry no further state and therefore recreation of the network topology is sufficient.

Figure 16:
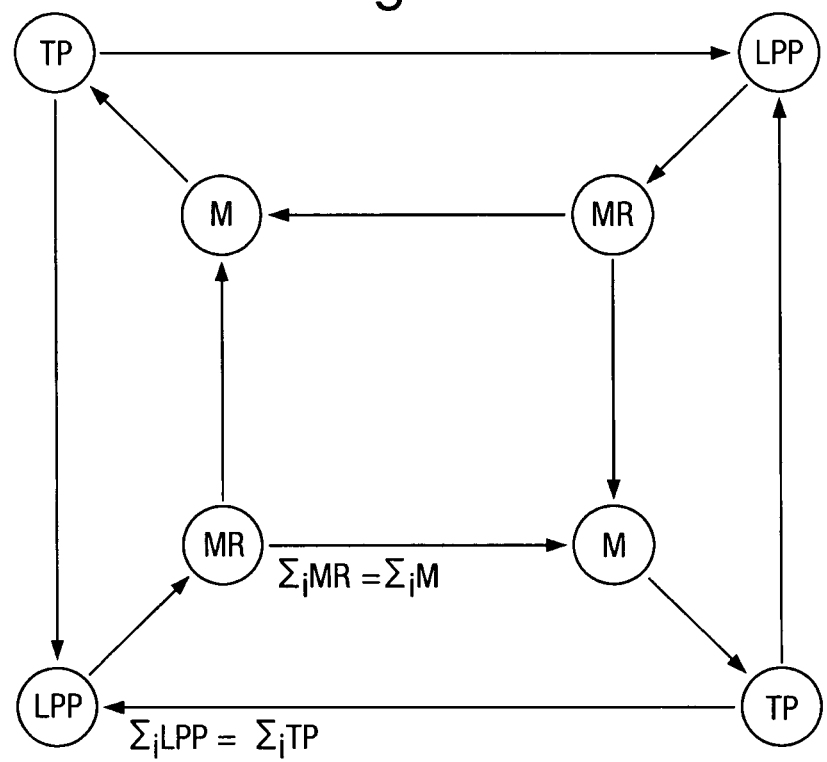
FIG. 16 illustrates an approach to failure handling involving the logging of messages at more than one node to generate new "system invariants"

It is noteworthy however that in the most general case, where a mediator logs every message, it is equally possible for MRs to log every message too, whereby the powerful system invariant that the sum of messages logged by the MRs is equal to the sum of messages logged by the mediators. It is therefore the case that a recovery strategy similar to that used for interest lists is possible to pursue in the event of a failure in either category. This approach is illustrated in FIG. 16.

Structural Refinement

The "reference model" cubic architecture represents only one way in which the component notes can be composed. The strength in the architecture rests on two pure concepts within the component nodes. Firstly, all node-to-node information flow is unidirectional; and each node receives messages from senders and relays that information within a set of further nodes. In the latter case, the set is, modulo changes to the system configuration, fixed.

Secondly, each node has no dependency on the global configuration of the system, other than knowledge of the totality of nodes that reference it as described elsewhere. The only other configuration information required by each node is the set of other nodes to which it may relay information. Mediator routers and transmission proxies each contain a function that determines which of its connected receiver nodes will receive a particular message. Thus no node requires knowledge of any other node more than one "hop" away from it.

Given these constraints, many possible configurations are possible, because each node is independent of the type of node sending information to it. The paradigm of LPP→M-R→M→TP→LPP is only one possible configuration of the node types, albeit a useful and practical one. Other configurations are possible giving different architectures for different needs.

The clear requirement is that each subnetwork must obey all the global invariants, and otherwise simulate the behaviour, of a single node within the architecture definitions. Whenever this is the case, nodes or node combinations may be arbitrarily replaced whenever this is advantageous in engineering terms.

Figure 17:
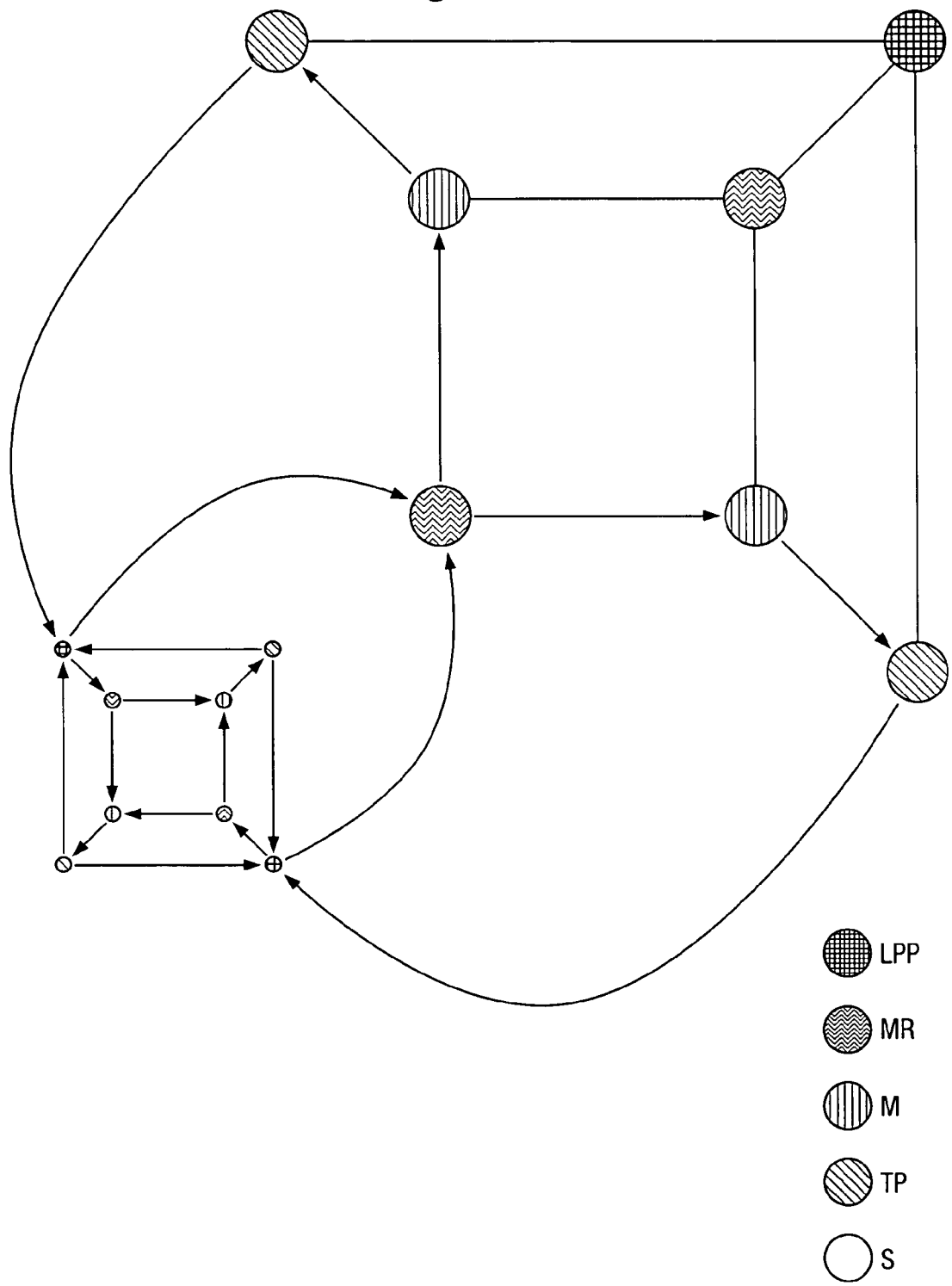
FIG. 17 illustrates a structural refinement of the cubic network to incorporate a further cubic subnetwork in place of an LPP node.

FIG. 17 illustrates one instance of a structural refinement, where a cubic network is refined to incorporate a further cubic subnetwork in place of an LPP node.

Many examples exist where physical locality makes a logical difference to the requirements of an information flow system.

Consider a situation where electronic information is used to underlie a physical purchase of goods, then locality is important without being a rigidly defining factor. Depending on the nature of the goods, a user may be prepared to go to different lengths to obtain a contract, based for example on: rarity, cost, or physical size. In all cases the nearer the object the better, however the upper bound on geography can not be decided a priori.

There are also instances where no physical goods are involved, but the information value degrades with distance from its source; for example, local news stories and domestic market trading are cases where most information flow will be within a geographical location, although once again global flow will be desired in some cases.

Based on the above scenarios, a number of useful inductive architecture instances may be identified, where a node or nodes, representing a locality or 'local market', are replaced with a complete local instance of the whole distribution network. The careful decoupling of node behaviour from overall system configuration gives a number of ways of achieving this, depending on both engineering and logical requirements of the system.

EXAMPLES

Examples and extensions of the distributed mediation network in accordance with the present invention are further illustrated in the following scenarios:

Scenario 1: A Client may subscribe to more than one network: that is, two networks may coexist, a local and a global, each with an LPP in the geographical domain of the Client. Here, it is assumed that the information systems are logically unconnected, i.e. the same message can not be processed within both local and global systems except through copying.

Scenario 2: An LPP may be a part of two networks, sending incoming messages to upstream networks of both and registering interest in downstream messages from two downstream networks. This is also fairly uninteresting, but worthy of note is that there are no design criteria within the LPP that prevent it from doing this. Again this scenario assumes logically unconnected information systems.

Scenario 3: Connected MRs. Only a single logical network exists, some information can flow globally. The predicate set of the upstream local network is altered to cause certain messages, based on content, to be forwarded to a further MR in the global network. Differences in routing rules allow MRs in local networks to push information, for which the content is indicated to be of more global interest, onto a global network (or at least a network that is a tier of hierarchy above the local network). This may be exclusively, or in conjunction with local mediator forwarding. Likewise, TPs in the local network are altered to express interest in TPs within the global network. As interest expressions are based on content, we could model the identity of the deriving network as a part of the content and express interest in all data that did not derive from the local network; that would prevent duplicate messages appearing in the LPPs from the downstream network. This model involves no change to the basic node definitions, and furthermore only a single logical view is given to both Clients and LPPs. Expressions of interest can be independently customised to global or local without changing the architecture as this is modelled within the content of the messages.

Figure 18:
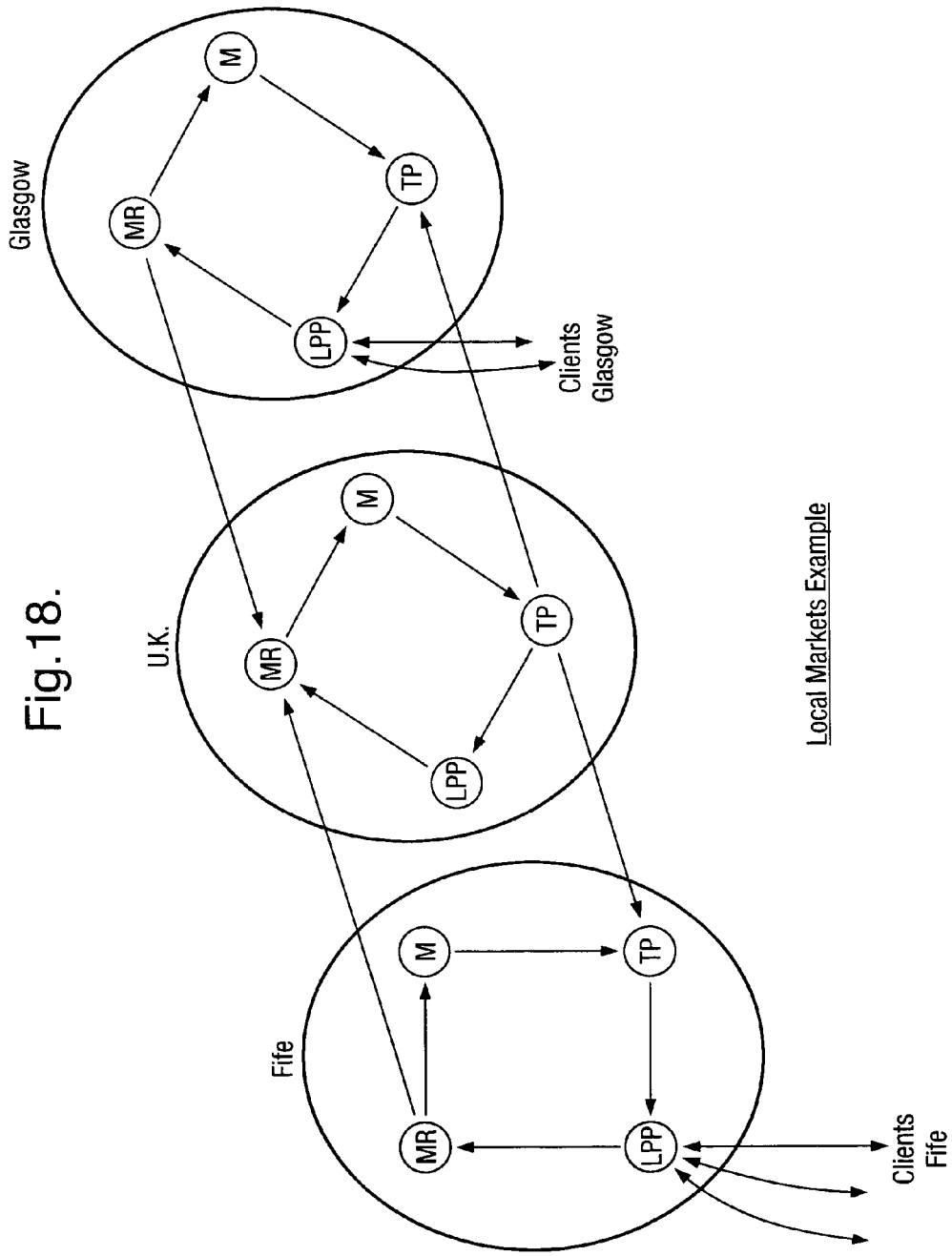
FIG. 18 illustrates a hierarchy of networks with connected MRs.

FIG. 18 illustrates a hierarchy of networks, with a 'global' (UK) network and two local (market) networks (Fife and Glasgow). MRs in Fife and Glasgow networks are shown forwarding certain messages to a further MR in the UK network.

Figure 19:
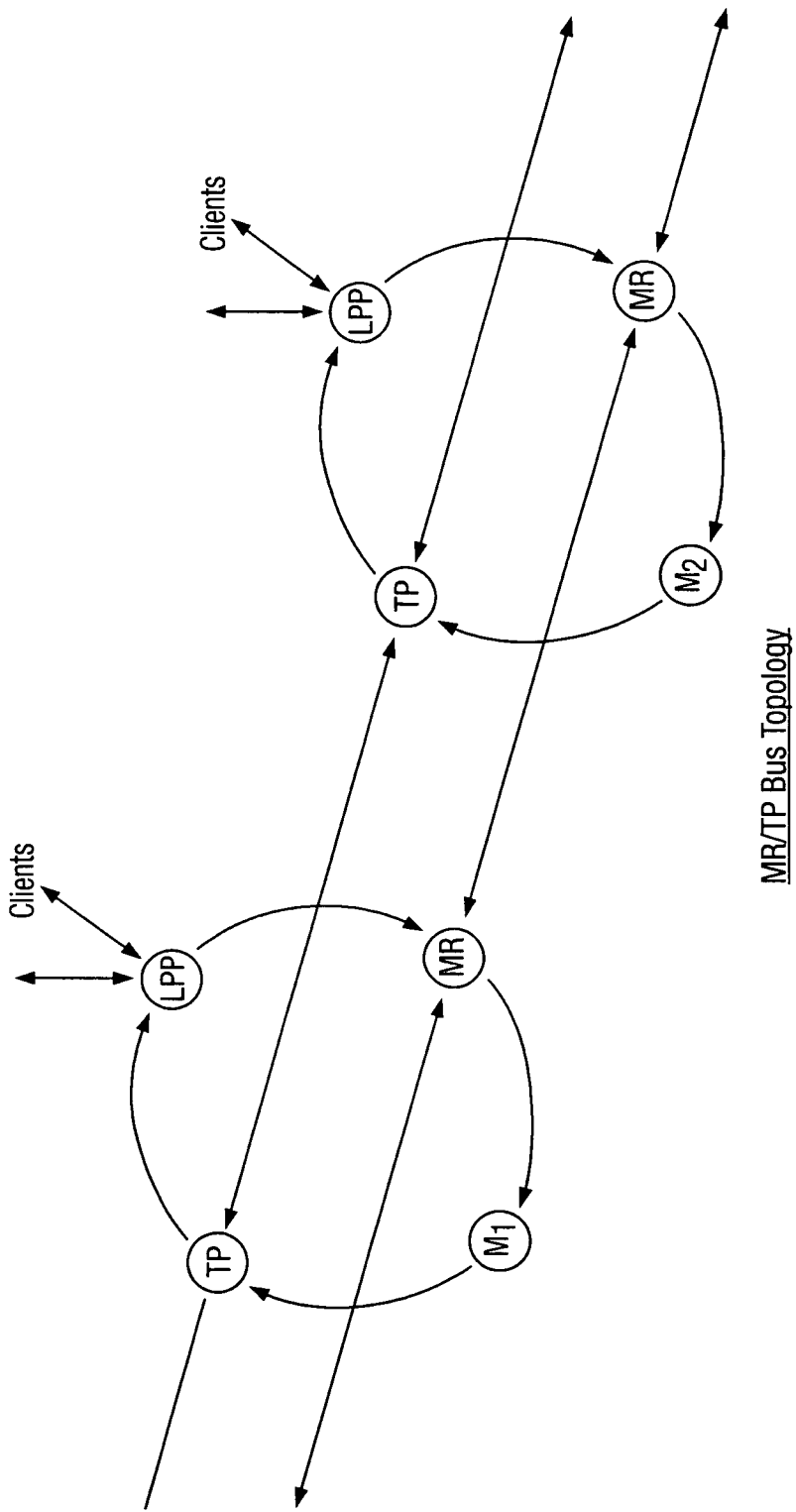
FIG. 19 shows an illustrative TP/MR bus topology.

Rather than maintain a strict hierarchy of local and global networks, the connected MRs can be treated as peers. This leads to a bus topology where the routing rules allow MRs to push messages to any other MRs they are linked to and conversely to receive messages from any of these other MRs. The TPs similarly linked as a "TP bus" ensure that individual portions of the network can promulgate interest expressions to the other portions of the network. Individual portions of the network still retain their characteristic unidirectionality and independence from the global configuration. FIG. 19 shows an illustrative TP/MR bus topology.

Scenario 4: MRs from the global network can act as LPPs or Clients of the local network, expressing interest in data of certain topics in the usual way. This allows the global network to receive data from local networks without impinging on that architecture in any way, but can only be used where no flow back is required to the local network. This would for example suit a system where clients were prepared to pay more to receive global information.

In financial markets, the use of mediated routing rather than a classic peer-to-peer architecture permits stored data to be recovered from order books distributed across a wide area network. The distributed mediation network architecture may be recursively applied to address problems such as the maintenance of domestic markets and cross border equity trading faced by, for example, a pan-European electronic exchange such as virt-x.

Likewise, the impact of geographically dispersed, volatile trading activity, such as that observed in the futures markets, can be absorbed by the application of a mediated routing architecture regardless of whether these fluctuating patterns of behaviour are triggered by diurnal patterns, or through rapid migration of trading from one financial centre to another and back.

Avoidance of Global Constraints

Each node in a distributed mediation network requires, at some point, some knowledge about the totality of nodes that refer to it. The identities of these nodes are never required; the information is only required to detect certain termination and configuration properties, which affect node behaviour during mediation or configuration change operations. In particular, there is a class of distributed operation, which acts to detect when all referring nodes have sent a message of a particular type.

In some cases, in particular MRs and TPs, the expectation is that relatively few nodes will refer to each one, and furthermore these nodes are likely to be relatively local. In this case, a simple reference count may be maintained without incurring excessive overhead.

In other cases, in particular Ms and LPPs, there may be a large number of referring nodes, which furthermore may be geographically diverse, and so the cost of maintaining a reference count may be high.

Crucially, the new node would have to contact every receiving node in the system.

In such cases, a variation on a credit recovery scheme may be used as follows. For a particular set of nodes, which will represent all of the nodes referring to a particular further node (the receiver node), each carries a state reflecting the amount of credit it has, initially with a total credit of 1.0 distributed amongst them. When the receiver node requires to detect if all nodes within that set have sent to it, it is arranged that the credit value of each such node is transmitted as a part of the message.

The receiver node requires to record the total of such received values in an accumulator, and when the value of the accumulator reaches 1.0 then it is known that all referring nodes have sent a message. When the topology of the network changes, for example through the addition or deletion of a new referring node, then the credit balance must be adjusted accordingly to ensure the global total of 1.0 is maintained.

This may be achieved by splitting credit with an existing node in the case of addition, or by amalgamating credit with another node in the case of deletion. Both such adjustments may occur at a local level, and furthermore many such localised changes can occur in parallel, thus avoiding the potential for a network-wide flurry of activity as would be the case with global reference counting.

Implementation

The distributed mediation network of the present invention may be implemented either as computer implemented software or hardware. As software, the implementation may be stored on volatile and/or non-volatile memory means. Computer program products, for example CD-ROMs, DVD-ROMs or data constructs retrieved from internet servers, may incorporate software representations of the network in accordance with the present invention.

In operation, the computer programs may be stored on nodes where the components for a particular function of the distributed mediation network may operate. Alternatively, they may be stored on a central repository that can be referenced from the nodes on which the component(s) for a particular function of the distributed mediation network may operate. The first step in setting up a distributed mediation network is to install the software and configure a basic network. For verification of the installation, a predefined cubic configuration may be provided. This configuration would run on one physical node and scripts would be provided to verify the correct operation of the distributed mediation network. Once the initial verification has been performed satisfactorily, the administrator of the system would deploy mediation programs for specific applications written by a programmer, for instance: Chat or Price feeds, to the Mediator (M) and Mediator Router (MR) nodes. Once the specific application logic is running in the distributed mediation network, users may connect to the distributed mediation network via an LPP. Additional logical nodes can be added to the system without any disruption to the users of the distributed mediation network.

As remarked upon earlier, a physical node is an actual hardware processor and will contain an operating system. Consequently, a physical node may contain one or more logical nodes, for instance a Local Point of Presence (LPP), a Mediator (M), a Mediator Router (MR) or a Transmission Proxy (TP).

The management interface with which the human operator interfaces provides functions for performing these changes in logical topology in accordance with the predicates and constraints described above. The management interface may also provide viewing and notification functions for monitoring the operation of the distributed mediation network.

The invention claimed is:

1. A method for performing distributed mediation tasks on messages in a computer network, wherein the computer network has a mediation network configured for transmission of messages between source nodes registered to provide messages to the mediation network and sink nodes registered to receive the messages from the mediation network, based on message classification, the mediation network comprising:
    at least one local point of presence (LPP) module for interfacing between the mediation network and the source and sink nodes;
    two or more mediator (M) modules for hosting one or more mediation tasks;
    at least one mediator router (MR) module for analyzing the content of incoming messages, each MR module routing the incoming messages received by the mediation network to a predetermined M module in dependence upon said content; and
    at least one transmission proxy (TP) module for forwarding mediated messages to at least one of said LPP modules for sending on to the sink nodes registered to receive the messages,
    wherein the at least one LPP module interfaces over connections of the computer network between the at least one MR module of the mediation network and the source nodes external to said mediation network when receiving said incoming messages to said mediation network, and over connections of the computer network between the at least one TP module of said mediation network and said sink nodes external to said mediation network when transmitting mediated messages from said mediation network,
    wherein each of the LPP, MR, M and TP modules are embodied by, and their respective functions implemented by, separate and distinct software entities, and wherein all message paths between each of said MR, M, and TP modules are unidirectional and non-reciprocal, so that, in the method, incoming messages to the mediation network are propagated from said source nodes to said sink nodes over connections of the mediation network via said MR, M, and TP modules without introducing a mediation bottleneck to said computer network along a mediation cycle that comprises the steps of:
    an LPP module addressing messages incoming to the mediation network from a source node to a respective one of said at least one MR module;
    at said addressed MR module, analyzing the content of said incoming messages and routing said incoming messages to a predetermined mediator module in dependence upon said analyzed content;
    at said predetermined mediator module:
        applying the mediation task to said incoming messages, the mediation task being one or more of logging said incoming messages and modifying said incoming messages; and
        directing said mediated messages to a respective one of said TP modules; and
    at said TP module that receives said mediated messages, forwarding said mediated messages to at least one of said LPP modules for forwarding to a sink node,
    wherein the messages incoming to the mediation network belong to one of the group of message types including client messages, control messages, or management messages, and
    wherein the analyzing the content of incoming messages and routing said incoming messages to a predetermined mediator module in dependence upon said analyzed content comprises a processor executing the analyzing the content of incoming messages and routing said incoming messages to a predetermined mediator module in dependence upon said analyzed content.

2. The method as claimed in claim 1, wherein said client messages belong to one of the group of message types including:
    new information, which emanates from a process acting as an information source;
    queries about state of nodes in the mediation network, which require a reply; and
    expressions of interest, which require ongoing replies whenever pertinent new information is received by the mediation network.

3. The method as claimed in claim 1, further comprising inducing a change in internal operation of the mediation network by directing a control message as an incoming message along the mediation cycle.

4. The method as claimed in claim 1, further comprising generating a message log of all incoming messages received by said predetermined mediator module.

5. The method as claimed in claim 4, wherein the mediation task applied to said analyzed messages at said predetermined mediator module includes generating the message log.

6. The method as claimed in claim 4, wherein the computer network further includes an external application, the method further comprising:
generating the message log in said external application.

7. A mediation network for performing distributed mediation tasks on messages in a computer network, wherein the mediation network is configured for transmission of messages between source nodes registered to provide messages to the mediation network and sink nodes registered to receive the messages from the mediation network, based on message classification, and wherein the mediation network includes:
at least one local point of presence (LPP) module for interfacing between the mediation network and the source and sink nodes;
two or more mediator (M) modules for hosting one or more mediation tasks;
at least one mediator router (MR) module for analyzing the content of incoming messages, each MR module routing the incoming messages received by the mediation network to an associated, predetermined M module in dependence upon said content; and
at least one transmission proxy (TP) module for forwarding mediated messages to at least one of said LPP modules for sending on to the sink nodes registered to receive the messages,
wherein the at least one LPP modules interfaces over connections of the computer network between the at least one MR modules of the mediation network and the source nodes external to said mediation network when receiving said incoming messages to said mediation network, and over connections of the computer network between the at least one TP module of said mediation network and said sink nodes external to said mediation network when transmitting mediated messages from said mediation network after a mediation task has been performed on said incoming messages, the mediation task being one or more of logging said incoming messages and modifying said incoming messages,
wherein each of the LPP, MR, M and TP modules are embodied by, and their respective functions implemented by, separate and distinct software entities, and wherein all message paths between each of said MR, M, and TP modules are unidirectional and non-reciprocal, so that the mediation network couples messages from said source nodes to said sink nodes over connections of the mediation network via said MR, M, and TP modules without introducing a mediation bottleneck to said computer network along a unidirectional mediation cycle in which: LPP modules address incoming messages from source nodes to MR modules; MR modules in turn address M modules; M modules in turn address TP modules; and TP modules in turn address LPP modules for forwarding said mediated messages to sink nodes, wherein the messages incoming to the mediation network belong to one of the group of message types including client messages, control messages, or management messages,
wherein the analyzing the content of incoming messages and routing said incoming messages to a predetermined mediator module in dependence upon said analyzed content comprises a processor executing the analyzing the content of incoming messages and routing said incoming messages to a predetermined mediator module in dependence upon said analyzed content.

8. The mediation network as claimed in claim 7, wherein the clientmessages belong to one of the group of message types including:
new information, which emanates from a process acting as an information source;
queries about state of nodes in the mediation network, which require a reply; and
expressions of interest, which require ongoing replies whenever pertinent new information is received by the mediation network.

9. The mediation network as claimed in claim 7, further comprising a control mechanism that induces a change in internal operation of the mediation network by directing a control message as an incoming message along the mediation cycle.

10. The mediation network as claimed in claim 7, further comprising means for generating a message log of all incoming messages received by said predetermined mediator module.

11. The mediation network as claimed in claim 10, wherein the mediation task applied to said analyzed messages at said predetermined mediator module includes generating the message log.

12. The mediation network as claimed in claim 10, wherein the computer network further includes an external application that generates the message log, the mediation network further comprising:
means for receiving the message log generated in said external application.

13. A non-transitory computer-readable storage medium having embodied thereon executable instructions for performing distributed mediation tasks on messages in a computer network, the executable instructions, which when executed by a computer, cause the computer to provide a mediation network configured for transmission of messages between source nodes registered to provide messages to the mediation network and sink nodes registered to receive the messages from the mediation network, based on message classification, the mediation network having:
at least one local point of presence (LPP) module for interfacing between the mediation network and the source and sink nodes;
two or more mediator (M) modules for hosting one or more mediation tasks;
at least one mediator router (MR) module for analyzing the content of incoming messages, each MR module routing the incoming messages received by the mediation network to a predetermined M module in dependence upon said content; and
at least one transmission proxy (TP) module for forwarding mediated messages to at least one of said LPP modules for sending on to the sink nodes registered to receive the messages,
wherein the at least one LPP module interfaces over connections of the computer network between the at least one MR module of the mediation network and the source nodes external to said mediation network when receiving said incoming messages to said mediation network, and over connections of the computer network between the at least one TP module of said mediation network and said sink nodes external to said mediation network when transmitting mediated messages from said mediation network, wherein each of the LPP, MR, M and TP modules are embodied by, and their respective functions implemented by, separate and distinct software entities, and wherein all message paths between each of said MR, M, and TP modules are unidirectional and non-reciprocal, so that when the instructions are executed, incoming messages to the mediation network are propagated from said source nodes to said sink nodes over connections of the mediation network via said MR, M, and TP modules without introducing a mediation bottleneck to said computer network along a mediation cycle that comprises the steps of:

an LPP module addressing messages incoming to the mediation network from a source node to a respective one of said at least one mediator router (MR) module;

at said addressed MR module, analyzing the content of said incoming messages and routing said incoming messages to a predetermined mediator module in dependence upon said analyzed content;

at said predetermined mediator module:
applying the mediation task to said incoming messages, the mediation task being one or more of logging said incoming messages and modifying said incoming messages; and
directing said mediated messages to a respective one of said TP modules; and at said TP module that receives said mediated messages, forwarding said mediated messages to at least one of said LPP modules for forwarding to a sink node, wherein the messages incoming to the mediation network belong to one of the group of message types including client messages, control messages, or management messages, and wherein the analyzing the content of incoming messages and routing said incoming messages to a predetermined mediator module in dependence upon said analyzed content comprises a processor executing the analyzing the content of incoming messages and routing said incoming messages to a predetermined mediator module in dependence upon said analyzed content.

14. The non transitory computer-readable storage medium as claimed in claim 13, wherein the client messages belong to one of the group of message types including:
new information, which emanates from a process acting as an information source;
queries about state of nodes in the mediation network, which require a reply; and
expressions of interest, which require ongoing replies whenever pertinent new information is received by the mediation network.

15. The non transitory computer-readable storage medium as claimed in claim 13, further comprising inducing a change in internal operation of the mediation network by directing a control message as an incoming message along the mediation cycle.

16. The non transitory computer-readable storage medium as claimed in claim 13, further comprising generating a message log of all incoming messages received by said predetermined mediator module.

17. The non transitory computer-readable storage medium as claimed in claim 16, wherein the mediation task applied to said analyzed messages at said predetermined mediator module includes generating the message log.

18. The non transitory computer-readable storage medium as claimed in claim 16, wherein the computer network further includes an external application, the computer program product further comprising:
generating the message log in said external application.

19. The non transitory computer-readable storage medium as claimed in claim 13, the computer-readable storage medium including instructions which, when executed by a computer, cause the computer to provide a datastore for storing information about the logical and physical structure of the mediated network.

20. The method as claimed in claim 1, wherein the mediation cycle is cyclical.

21. The network as claimed in claim 7, wherein the message path is cyclical.

22. The non transitory computer-readable storage medium as claimed in claim 13, wherein the mediation cycle is cyclical.

* * * * *